(12) United States Patent
Konig

(10) Patent No.: US 8,812,228 B2
(45) Date of Patent: Aug. 19, 2014

(54) METHOD AND APPARATUS FOR MIXED STATIC AND DYNAMIC ROUTING

(75) Inventor: Mirko Konig, Berlin (DE)

(73) Assignee: NAVTEQ B.V., Veldhoven (NL)

( * ) Notice: Subject to any disclaimer, the term of this patent is extended or adjusted under 35 U.S.C. 154(b) by 940 days.

(21) Appl. No.: 12/635,457

(22) Filed: Dec. 10, 2009

(65) Prior Publication Data
US 2011/0144898 A1    Jun. 16, 2011

(51) Int. Cl.
*G01C 21/00*     (2006.01)

(52) U.S. Cl.
USPC .......................................... 701/400; 340/988

(58) Field of Classification Search
USPC ......... 701/400, 408–412, 418, 426, 467, 469; 340/988, 995.1, 995.19; 455/456.1, 455/456.2, 457
See application file for complete search history.

(56) References Cited

U.S. PATENT DOCUMENTS

| | | | |
|---|---|---|---|
| 5,463,554 A | | 10/1995 | Araki et al. |
| 6,320,518 B2* | | 11/2001 | Saeki et al. ............... 340/995.12 |
| 7,920,967 B1* | | 4/2011 | Harris et al. ................... 701/431 |
| 8,014,943 B2* | | 9/2011 | Jakobson ...................... 701/439 |
| 2003/0208315 A1 | | 11/2003 | Mays |
| 2008/0033633 A1 | | 2/2008 | Akiyoshi et al. |
| 2008/0076451 A1 | | 3/2008 | Sheha et al. |
| 2008/0120022 A1 | | 5/2008 | Hayot et al. |
| 2008/0154489 A1 | | 6/2008 | Kaneda et al. |
| 2008/0275646 A1 | | 11/2008 | Perng et al. |
| 2009/0112467 A1 | | 4/2009 | Jiang et al. |
| 2009/0125229 A1 | | 5/2009 | Peri et al. |
| 2009/0281719 A1 | | 11/2009 | Jakobson |

FOREIGN PATENT DOCUMENTS

| | | |
|---|---|---|
| EP | 1 267 146 A1 | 12/2002 |
| WO | WO 2007/131225 A2 | 11/2007 |
| WO | WO 2008/093935 A1 | 8/2008 |

OTHER PUBLICATIONS

International Search Report and Written Opinion for corresponding PCT App. PCT/FI2010/050994 dated Apr. 6, 2011, pp. 1-13.
Navigating with your Bushnell NAV500 Portable GPS NAV System. Bushnell NAV500 Navigation Software Manual, Version 1.0, 2006, pp. 1-25.

* cited by examiner

*Primary Examiner* — Dalena Tran

(74) *Attorney, Agent, or Firm* — Ditthavong & Steiner, P.C.

(57) ABSTRACT

Techniques for mixed static and dynamic routing include determining a subset of less than all of a plurality of stopover points of an initial route of ordered stopover points. In the subset, all stopover points are marked as dynamic to indicate that their order is allowed to change. It is also determined whether there are at least two stopover points for which order may be changed. If there are at least two stopover points for which order may be changed, then a computed route is determined in which an order in the computed route of the stopover points of the subset minimizes a metric for the entire route compared to any other allowed order of the stopover points of the subset.

20 Claims, 12 Drawing Sheets

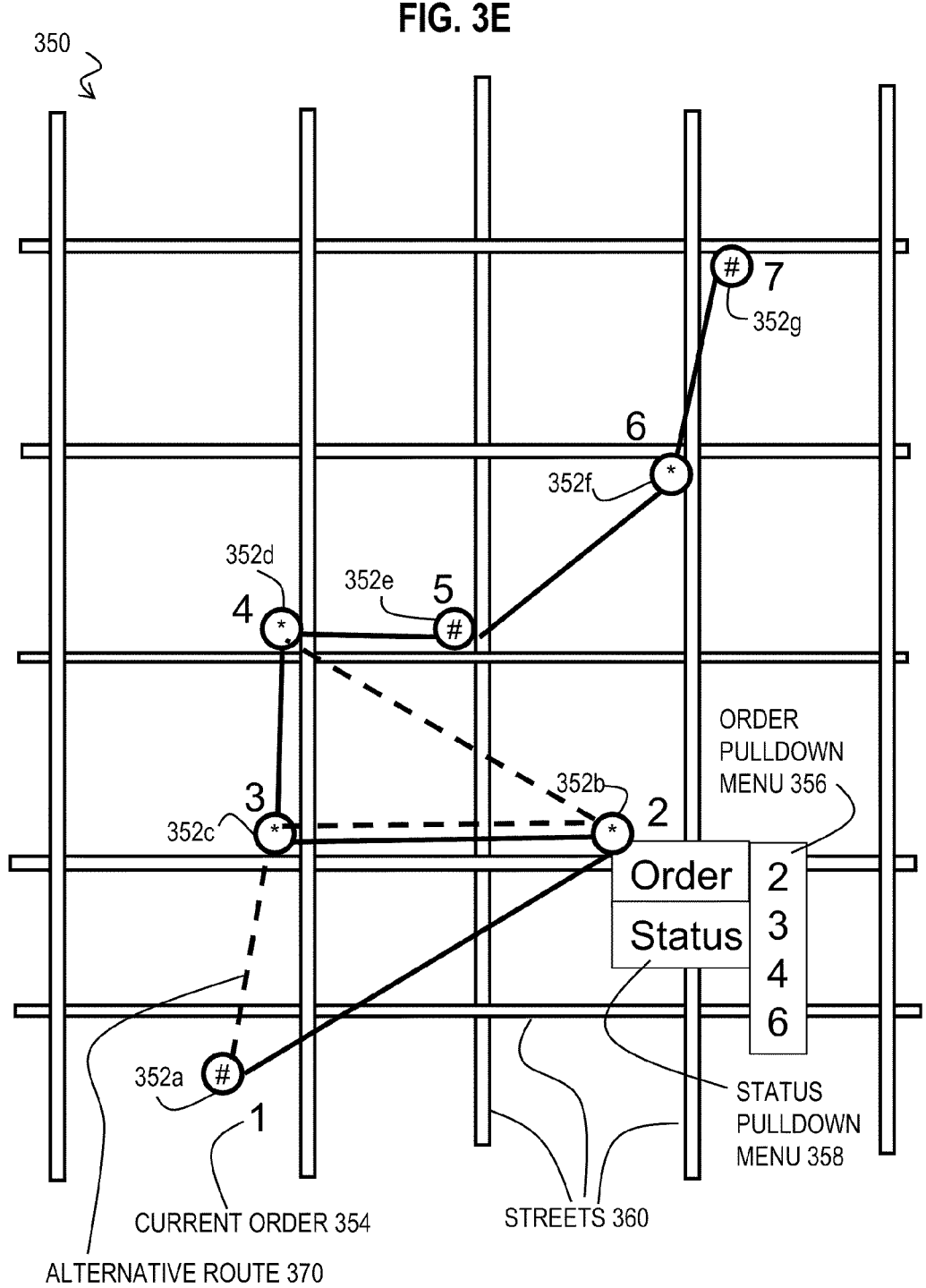

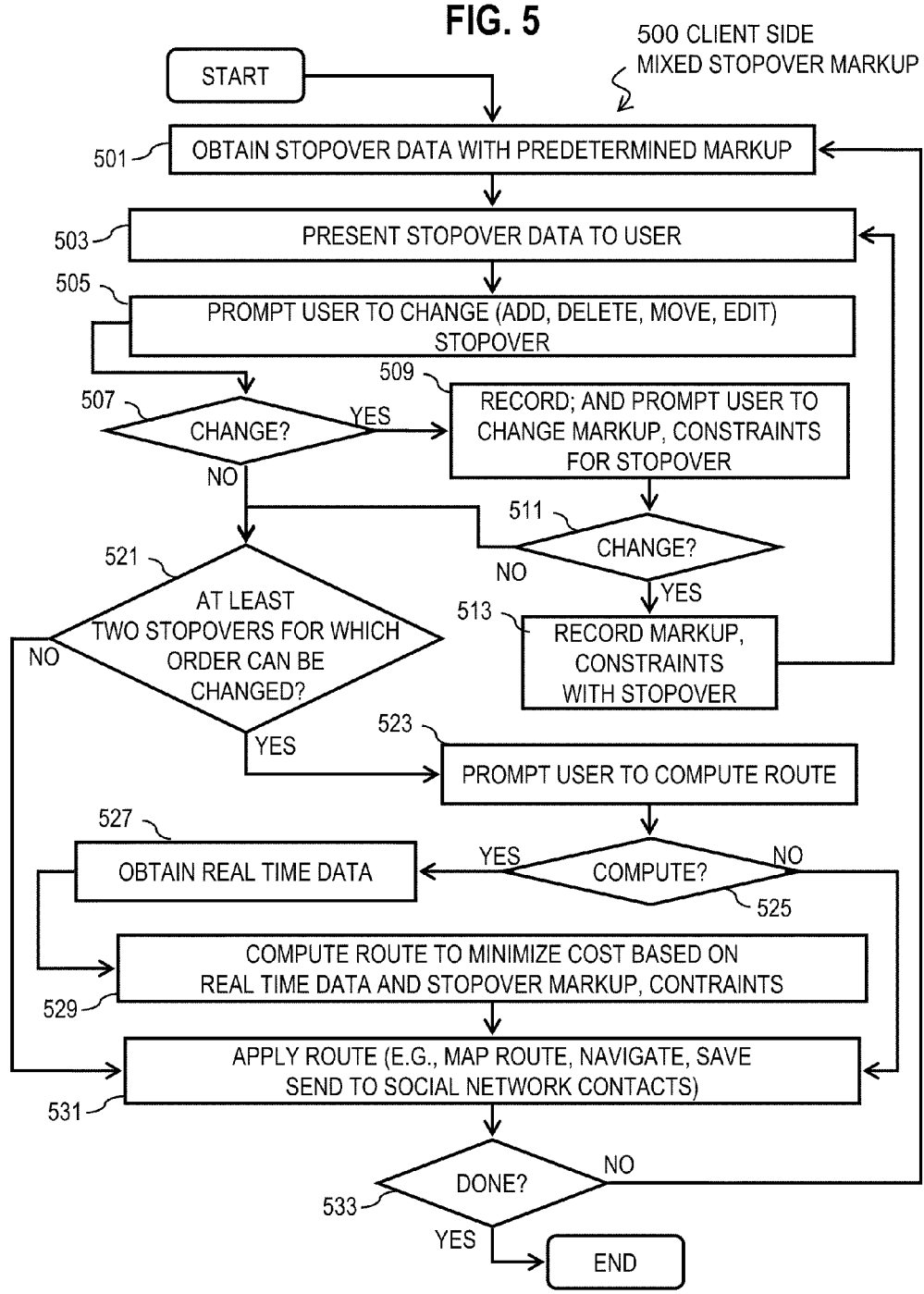

METHOD AND APPARATUS FOR MIXED STATIC AND DYNAMIC ROUTING

BACKGROUND

Network service providers and device manufacturers are continually challenged to deliver value and convenience to consumers by, for example, providing compelling network services. Navigation services are very popular, in which a user specifies a start endpoint and stop endpoint for a trip; and a navigation system indicates a best route between the endpoints, minimizing a metric such as total time traveling at speed limits, total money to be paid, or total distance. Points of interest along the route, such as banks, restaurants, police stations and stadia are often also provided. Mobile navigation systems use data about the user's current location as an endpoint or to update the best route. Wireless network devices, such as cellular telephones, are often equipped with position determination devices, such as access point locations (e.g., cell tower locations), and global positioning system (GPS) receivers; and, can thus offer rich navigation updating features similar to other mobile navigation systems.

In many systems, a user can specify intervening stopover points in addition to the start and stop endpoints. In some embodiments, the intervening stopover points are static and are incorporated into a route between endpoints in the order that the user specifies the stopover points. Only waypoints of paths between static stopover points are determined dynamically. In some embodiments, the stopover points themselves are dynamic, and are incorporated into a route between endpoints in an order determined by the system to minimize the total metric between endpoints.

SOME EXAMPLE EMBODIMENTS

Applicant has determined that it would be advantageous to allow a user to specify the order of some static stopover points but allow the navigation system to dynamically order other stopover points to minimize a metric for the entire route. As used herein, stopover points exclude both endpoints and include all intervening stopover points. Therefore, there is a need for an approach for arbitrarily mixing static and dynamic stopover points during routing in a navigation system.

According to one embodiment, a method comprises determining a subset of less than all of a plurality of stopover points of an initial route of ordered stopover points. In the subset all stopover points are marked as dynamic to indicate that their order is allowed to change. The method also comprises determining whether there are at least two stopover points for which order may be changed. The method further comprises, if there are at least two stopover points for which order may be changed, then causing a computed route to be determined. An order in the route of the stopover points of the subset minimizes a metric for the entire route compared to any other allowed order of the stopover points of the subset.

According to another embodiment, an apparatus comprises at least one processor, and at least one memory including computer program code, the at least one memory and the computer program code configured to, with the at least one processor, cause, at least in part, the apparatus to determine a subset of less than all of a plurality of stopover points of an initial route of ordered stopover points. In the subset all stopover points are marked as dynamic to indicate that their order is allowed to change. The apparatus is also caused to determine whether there are at least two stopover points for which order may be changed. The apparatus is further caused to determine a computed route, if there are at least two stopover points for which order may be changed. An order in the route of the stopover points of the subset minimizes a metric for the entire route compared to any other allowed order of the stopover points of the subset.

According to another embodiment, a computer-readable storage medium carries one or more sequences of one or more instructions which, when executed by one or more processors, cause, at least in part, an apparatus to determine a subset of less than all of a plurality of stopover points of an initial route of ordered stopover points. In the subset all stopover points are marked as dynamic to indicate that their order is allowed to change. The apparatus is also caused to determine whether there are at least two stopover points for which order may be changed. The apparatus is further caused to determine a computed route, if there are at least two stopover points for which order may be changed. An order in the route of the stopover points of the subset minimizes a metric for the entire route compared to any other allowed order of the stopover points of the subset.

According to another embodiment, an apparatus comprises means for determining a subset of less than all of a plurality of stopover points of an initial route of ordered stopover points. In the subset all stopover points are marked as dynamic to indicate that their order is allowed to change. The apparatus also comprises means for determining whether there are at least two stopover points for which order may be changed. The apparatus further comprises means for determining a computed route, if there are at least two stopover points for which order may be changed. An order in the route of the stopover points of the subset minimizes a metric for the entire route compared to any other allowed order of the stopover points of the subset.

According to another embodiment, a graphical user interface displayed on an apparatus includes fields to indicate a plurality of stopover points and a corresponding plurality of markup fields. Each markup field holds data that indicates whether the corresponding stopover point is a static stopover point that is unable to change its order relative to other static stopover points or a dynamic stopover point that is able to change its order relative to other dynamic stopover points. The apparatus is configured to allow a user to input data at least for the markup fields.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3E is a diagram of a graphical user interface for marking mixed dynamic and static stopover points, according to another embodiment;

FIG. 5 is a flowchart of a client process for mixed static and dynamic routing, according to one embodiment;

DESCRIPTION OF SOME EMBODIMENTS

Examples of a method, apparatus, and computer program for mixed static and dynamic routing are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term stopover point refers to any location through which a route is required to pass between endpoints. The order and timing of passing through the way point is subject to user requirements or dynamically determined to minimize some metric. A static stopover point is one for which the user has specified at the outset the relative order in a final route, and for which the user has indicated that order manually to the navigation system. A dynamic stopover point is one for which the navigation system determines the order automatically in order to reduce a metric for an entire route, while preserving the manually specified order. Any quantity may serve as the metric, such as travel time, total distance, money spent, among others, alone or in some combination, e.g., a weighted sum. Although various embodiments are described with respect to a wireless mobile terminal, it is contemplated that the approach described herein may be used with other network nodes, including fixed and wired terminals. An advantage of fixed terminals is that one or more routes can be planned ahead of time, and then transferred to a wireless mobile terminal for use during navigation, saving time and tedium on the wireless terminal. Thus a fixed means for mixed static and dynamic routing is anticipated, e.g., using a computer system depicted in FIG. 7. An advantage of wireless terminals is that they are mobile and can be updated with real time data as the user travels the route. Thus a wireless means for mixed static and dynamic routing is anticipated, e.g., using a mobile terminal depicted in FIG. 9.

Figure 1:
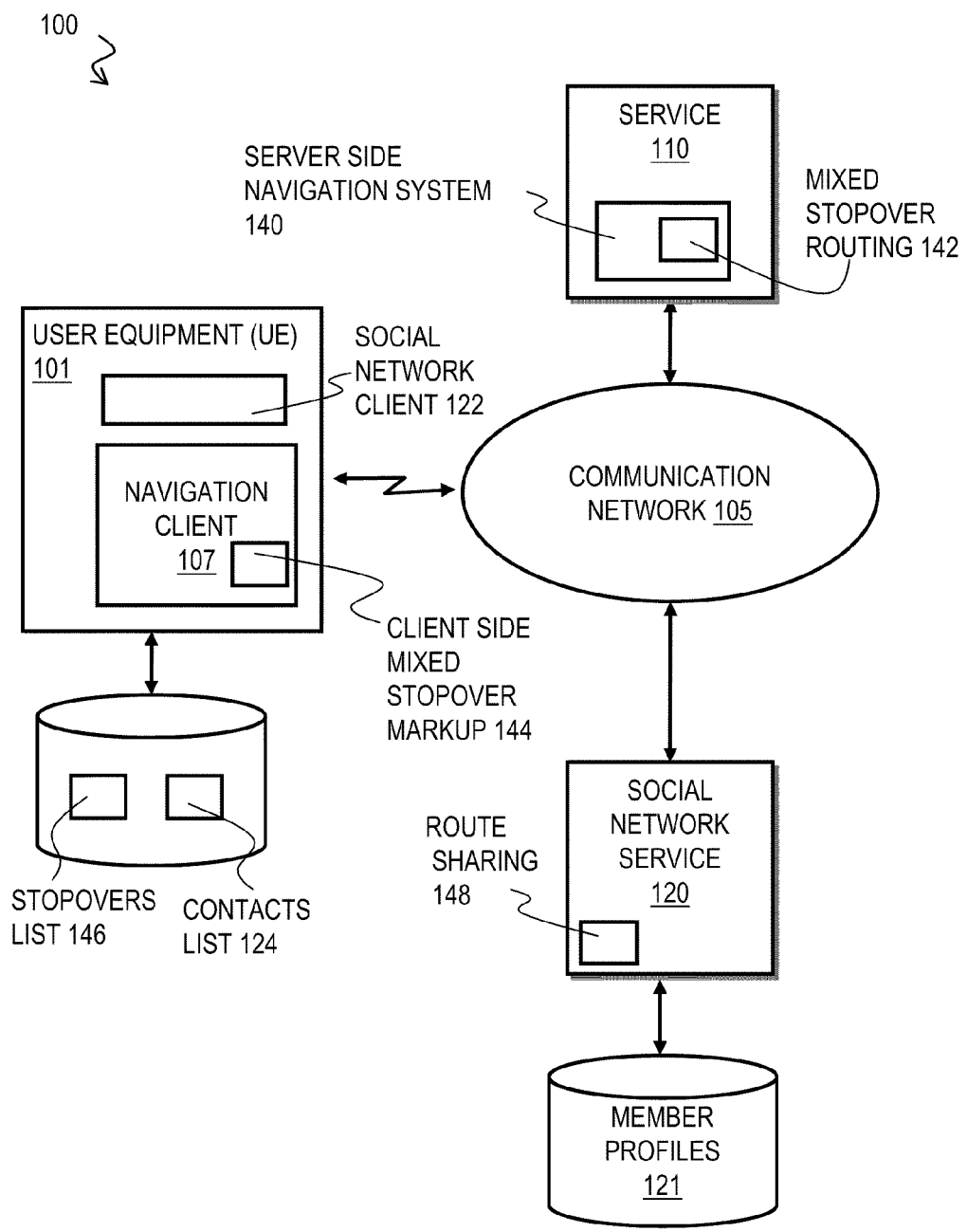
FIG. 1 is a diagram of a system capable of mixed static and dynamic routing, according to one embodiment.

FIG. 1 is a diagram of a system capable of mixed static and dynamic routing, according to one embodiment. A user is not completely served by a navigation system that supports either dynamic or static stopover points alone in one route. It is advantageous to allow a user to specify the order of some static stopover points but allow the navigation system to dynamically order other stopover points to minimize a total metric of a single route. For example, a user returning to home from work decides to do some shopping and errands, such as buying groceries and picking up mail at the post office, but needs to stop at a bank to deposit or withdraw money before making any of the stops involving the payment of money. The user does not care what order the errand stops or shopping stops are made, except that the stops involving payments must be done after the stop at the bank. Thus the user would want to specify that the bank must be visited before the stop involving payments, while the order in other respects is allowed to vary to minimize the metric. In some sense the bank stop is treated as a static stopover point and the payment stops may be arranged dynamically to minimize a metric for the route between the bank and home. The non-payment stops may be done in any order before going to the bank, and the user desires they be ordered also to minimize the metric. Thus the user desires to arbitrarily mix static and dynamic stopover points in the same route.

To address this problem, a system 100 of FIG. 1 introduces the capability to mix static and dynamic stopover points in determining a route for a user. In some embodiments, the mixed static and dynamic stopover points of a user's route are shared with contacts of the user, e.g., through a social network service. An advantage of sharing with a contact is that multiple users (such as multiple subscribers to a social network) can coordinate their routes, and routes can be sent from one user device to another device of the same user (e.g., laptop to cell phone). Thus a means for sharing static and dynamic stopover points among multiple network devices, such as a social network service, is used in some embodiments.

As shown in FIG. 1, the system 100 comprises user equipment (UE) 101 having connectivity to service 110 and a social network service 120 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The service 110 includes a server side navigation system 140 to support the service 110, such as a travel service for booking hotels and common carriers is supported by a navigation system, or a social network service is supported by a navigation system. In some embodiments, the service 110 is itself a navigation system for planning routes of a remote user. According to some embodiments, the server side navigation system 140 includes a module 142 for mixed stopover point routing, as described in more detail below. The mixed stopover point routing module 142 determines a route that passes through stopover points supplied by a user in an order that satisfies the user specified order for static stopover points and passes through dynamic stopover points in an order that minimizes a metric for the entire route.

The social networking service 120 maintains a database 121 of member profiles, which indicates members of the social network and associations among members, called member contacts herein. According to some embodiments, the social network service 120 includes a route sharing module 148 that supports sharing routes with mixed static and dynamic stopover points. For example, the social network service stores one or more routes with dynamic and static stopover points in user profiles database 121, which can be shared with other subscribers to the social network. Thus a social network means for sharing mixed static and dynamic stopover points is anticipated, The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

In the illustrated embodiment, the UE 101 includes a social network client process 122 and a navigation client process 107. The social network client 122 interacts with the social network service 120 and maintains a database 124 of contacts for the user of UE 101. The navigation client 107 maintains a database 146 of stopover points for one or more routes for the user of UE 101. According to the illustrated embodiments, the navigation client process 107 includes a client side mixed stopover point markup module 144, which allows the user to indicate both static and dynamic stopover points for each of one or more routes. In some embodiments, the navigation client 107 includes some or all of the mixed stopover point routing module 144. An advantage of performing more steps locally in client 107 is reduced consumption of bandwidth, so the module 144 is a means to perform more steps locally than just marking static and dynamic stopover points. An advantage of performing more steps remotely on module 142, is the utilization of an often more powerful processor at the remote node; so the module 142 is a means to perform more or all steps after marking points as static or dynamic.

By way of example, the UE 101, service 110 and social network 120 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

The client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others. A well known client process available on most nodes connected to a communications network is a World Wide Web client (called a "web browser," or simply "browser") that interacts through messages formatted according to the hypertext transfer protocol (HTTP) with any of a large number of servers called World Wide Web servers that provide web pages. In some embodiments, either or both the social network client 122 or the navigation client 107 is a browser presenting a web page provided by service 120 or 110, respectively.

By way of example, the client side mixed stopover point markup module 144 or mixed stopover point routing module 142 includes one or more components for providing mixed static and dynamic routing. It is contemplated that the functions of these components may be combined in one or more components or performed by other components of equivalent functionality. For example, in some embodiments, the navigation client 107 includes both the client side mixed stopover markup module 144 and the mixed stopover routing module 142.

Figure 2:
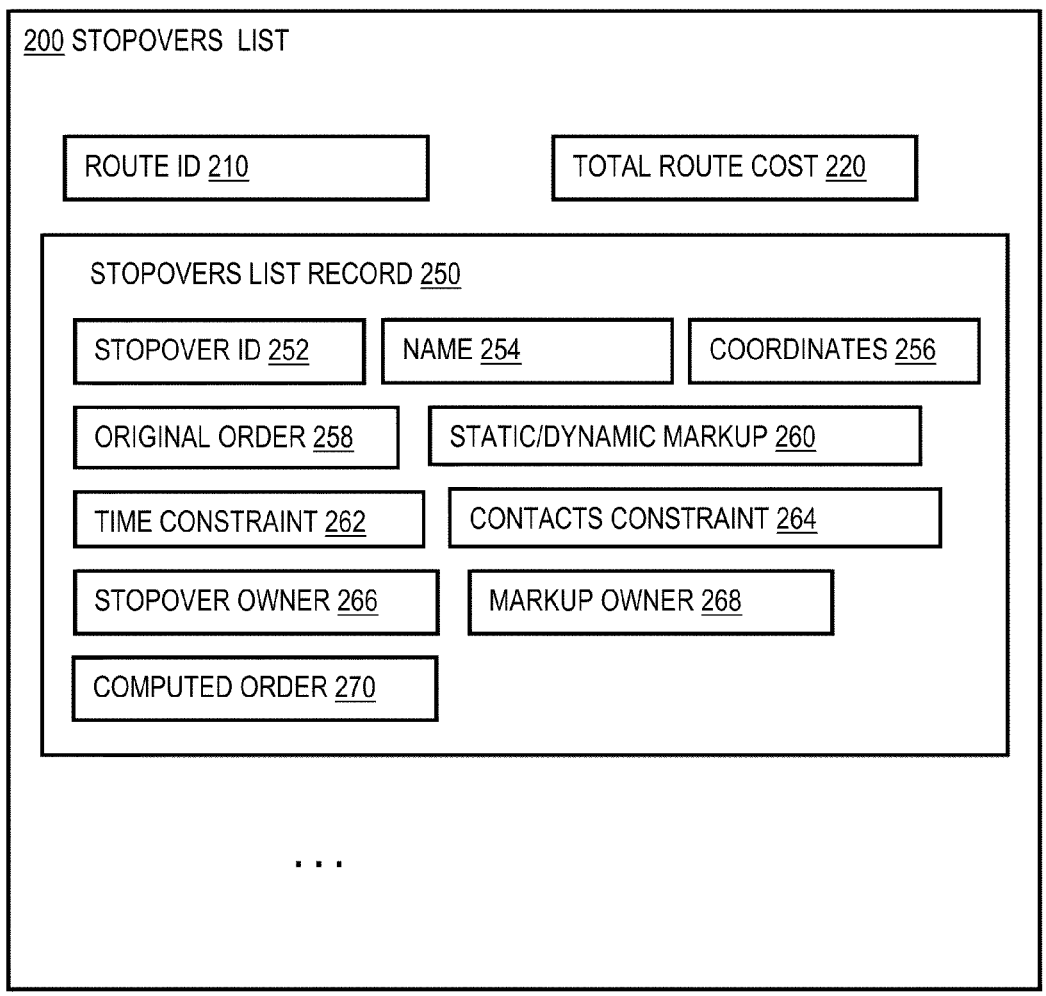
FIG. 2 is a diagram of the fields of a stopover list data structure, according to an embodiment.

FIG. 2 is a diagram of the fields of a stopovers list data structure 200, according to an embodiment, e.g., in database 146. The stopovers list data structure 200 includes a route ID field 210, a total route metric field 220 and two or more stopovers list record fields 250. In some embodiments, a message exchanged between navigation client 107 and navigation system 140 or social network service 120 includes one or more fields of stopovers list data structure 200. Thus, one or more of the fields in data structure 200 are means for storing, transmitting and processing stopover points for mixed static and dynamic routing. For example, in some embodiments only a stopover point identifier field 252 and a markup field 260 are included. The advantage of few fields is compact storage. The advantages of each of the other fields in various other embodiments are to provide more information for local processing, or to provided more control, e.g., to provide for time or contact constraints.

The route ID field 210 holds data that indicates a particular route for a user such as a record index into the database. In some embodiments, the route ID field 210 includes data that uniquely identifies the user of UE 101, or otherwise renders the contents of route ID field 210 unique among all users of the navigation system 100. The total route metric field 220 holds data that indicates the total metric for the route in units of the metric. If a route has been dynamically ordered, the value in field 220 is a value of the metric for the dynamically ordered route. Otherwise, in some embodiments, the value in field 220 is null. In some embodiments, instead of a null value, the value in the field 220 is a value of the metric of the route for the original order of the stopovers as that order is manually input by the user.

In the illustrated embodiment, each stopovers list record 250 includes for one stopover point, a stopover ID field 252, a name field 254, a coordinates field 256, an original order field 258, a static/dynamic markup field 260, a time constraint field 262, a contacts constraint field 264, a stopover point owner field 266, a markup owner field 268 and computed order field 270.

Stopover ID field 252 holds data that indicates the particular record 250 among all records in all stopover lists in database 146, such as a record index into the database. In some embodiments, the stopover ID field 252 includes data that uniquely identifies the user of UE 101, or otherwise renders the contents of stopover ID field unique among all users of the navigation system 100. The name field 254 holds data that indicates a name for the stopover point, e.g., a name suitable for display to a user so that the user can readily identify the stopover point, such as "Bob's Butcher Boutique, Bank Boulevard, Bonn" or its associated unique webpage uniform resources locator (URL), e.g., "bobsbutchebonn.com" The coordinates field 256 holds data that indicates the map coordinates for the stopover point, using any convention known in the art, such as latitude and longitude, or an identifier for a nearest node of a network model of streets and roads. In some embodiments, the stopover ID 252 uniquely identifies the stopover point for the navigation system which already associates the map coordinates thereto, and coordinates field 256 is omitted The original order field 258 holds data that indicates the order of the stopover point in a list of stopover points for a single route as manually input by a user. For purposes of illustration, it is assumed that a user inputs 7 stopover points in the following order indicated by names: work, post office, bank, grocery, gym, café, home. Then, the stopover list record 250 for the grocery stopover point has a value that indicates the numeral four (4) in original order field 258.

The static/dynamic markup field 260 holds data that indicates whether the stopover point is a dynamic or static stopover point, as manually input by the user. In some embodiments, the user is allowed to specify multiple different kinds of static or dynamic stopover points, or both, as described in more detail below. For example, data in field 260 can indicate a static fixed stopover point that cannot change order in the route, or static relative stopover point that can change order in the route but cannot change order relative to any other static stopover point. Start and stop endpoints that cannot be moved would be marked static fixed in field 260. For purposes of illustration it is assumed that the grocery stopover point is marked as dynamic in field 256.

The time constraint field 262 holds data that indicates whether the route is to provide that the stopover point is reached within a particular time window. Any method may be used to specify the time window, e.g., a certain start time and end time on a certain date, or a relative time after start of the route, or a dynamically determined time such as when a certain contact is in the vicinity of the stopover point. In some embodiments, a time constraint is not allowed, and field 262 is omitted.

The contacts constraint field 264 holds data that indicates whether the route is to provide that the stopover point is reached in conjunction with one or more contacts. Any method may be used to specify contacts constraint, such a listing one or more contacts whose actual or planned presence affects the order of the stopover point in the route. In some embodiments, a contacts constraint is not allowed, and field 264 is omitted.

The stopover owner field 266 holds data that indicates which member of a social network added the stopover to the route and hence owns that stopover point. For example, if Alice shares a route with Charles, then Charles could add a stopover point, such as a stopover named "library," e.g., so that Alice could pick up a book for Charles on Alice's way home, or Charles could change the value of the order in field 258. In this case, Charles would own the library stopover point. In some embodiments, sharing among contacts, such as friends in a social network service, is not employed; and field 266 is omitted.

The markup owner field 266 holds data that indicates which member of a social network most recently provided the markup value in field 260 and hence owns that value in field 260. For example, if Alice shares a route with Charles, then Charles could change a stopover that Alice entered as dynamic and make it static. In this case, Charles would own the markup value in field 260 and Charles would be indicated in field 268. In some embodiments, sharing among contacts, such as friends in a social network service, is not employed; and field 268 is omitted.

Computed order field 270 holds data that indicates the order of the stopover point after the navigation system automatically minimizes the metric for the route. For example, if the grocery dynamic stopover is dynamically moved from the fourth position in the order to the sixth position in the order to minimize a metric, then the computed order field 270 holds data that indicates the value six (6).

Although fields in list data structure 200, or record 250 are depicted as integral units in a particular order in a single database or record for purposes of illustration, in other embodiments one or more fields, or portions thereof, are arranged in the same or different order in one or more records in one or more databases on one or more devices connected to network 105 or exchanged in one or more messages through network 105, or one or more fields are omitted, or additional fields added, or some combination of changes are made.

Figure 3A:
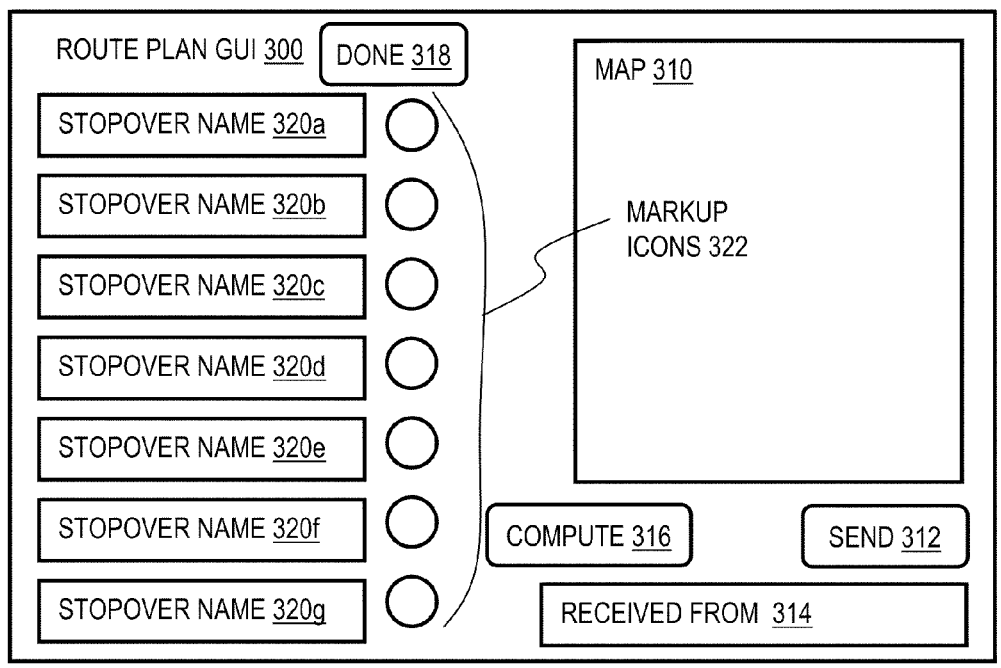
FIG. 3A is a diagram of a graphical user interface for marking mixed dynamic and static stopover points, according to an embodiment.

FIG. 3A is a diagram of a graphical user interface 300 for marking mixed dynamic and static stopover points, according to an embodiment. This graphical user interface (GUI) is called the route plan GUI 300 herein and is presented to a user of UE 101 to allow the user to accumulate stopover points for a new route and to mark those points as dynamic or static. The GUI 300 includes a map area 310 from which the user can select stopover points and an array of areas 320a through 320g for the names of selected stopover points, collectively referenced hereinafter as stopover name areas 320. As each stopover points is selected, a corresponding record 250 is added to the stopovers list data structure 200, e.g., in stopovers list database 146. In the illustrated embodiment, markup icons 322 are associated, one each, with the stopover name areas 320 to allow a user to indicate whether the stopover is a dynamic stopover point or a static stopover point. In some embodiments, the markup icons 322 are integrated with the corresponding stopover name areas 320.

In the illustrated embodiment, the route plan GUI 300 includes a done button 318 to be activated by a user, e.g., using a pointing device, to indicate that the list of stopover points and associated markup as dynamic or static for the route is complete. In the illustrated embodiment, the GUI 300 includes a compute button 316 to be activated by a user, e.g., using a pointing device, to indicate that any dynamic points can be re-ordered for the purpose of minimizing the metric. If values for the original order field 258 are null when the compute button is activated, the order of the stopover points before computing new positions for the dynamic stopover points are stored in the original order fields 258 of the corresponding stopovers list records 250. In some embodiments that allow routes to be shared, the GUI includes a send button 312 to send the list of stopover points and associated markups to a contact of the user of UE 101, or a "received from" field 314 to indicate a contact of the user from whom the route was received, or both, as shown. In some embodiments, such routes are sent or received through the route sharing process 148 of a social network service 120.

In various embodiments, the route plan GUI 300 is configured so that a user can move the stopover names in the stopover name areas 320 to manually order the stopover points, e.g., by selecting a name and dragging it to an area above or below its current area, using drag and drop mechanisms well known in the art. The GUI is also configured to allow the user to mark each name as a dynamic or static stopover point, and to so indicate that markup value in the markup icons 322. When a name is moved in the list, the corresponding markup icon moves correspondingly to stay associated with the stopover name. In some embodiments, the number of stopover points is too great to be displayed in the stopover name areas of GUI 300 at one time; and, a vertical control area, such as a vertical scroll bar (not shown), is also displayed to allow the user to scroll to a stopover name not currently in a displayed portion of the route plan GUI 300.

In some embodiments, one static type of stopover point and one dynamic type of stopover point are allowed, and the two types are indicated by two symbols or two colors. For purposes of illustration, it is assumed that in a symbol embodiment a static stopover point is indicated by a pound sign (#) and a dynamic stopover point is indicated by an asterisk (*). For purposes of an alternative illustration, it is assumed that in a color embodiment a static stopover point is indicated by a red icon 322 (or red name area 320), and a dynamic stopover point is indicated by a blue icon 322 (or blue name area 320).

In some such embodiments, the static stopover point is a static fixed stopover point that must retain its ordinal position within the route and thus retains an original overall position in the computed route. In some of these embodiments, a dynamic stopover point is a dynamic non jump stopover point that is allowed only to change places with another dynamic stopover point between the same two static stopover points, and is not allowed to jump over a static stopover point. Thus a dynamic non jump stopover point is prevented from changing order relative to a stopover point marked fixed.

In some embodiments, two static types of stopover point and two dynamic types of stopover points are allowed, and the four types are indicated by four symbols and colors, in any combination. For purposes of illustration, it is assumed that in a symbol embodiment a static fixed stopover point is indicated by a pound sign (#), a static relative stopover point is indicate by a dollar sign ($), a dynamic no-jump stopover point is indicated by an asterisk (*), and a dynamic jump stopover point is indicated by an ampersand (&). For purposes of an alternative illustration, it is assumed that in a color embodiment a static fixed stopover point is indicated by a red icon 322 or red name area 320, a static relative stopover point is indicate by a yellow markup icon 322 or yellow name area 320, a dynamic no-jump stopover point is indicated by blue markup icon 322 or blue name area 320, and a dynamic jump stopover point is indicated by a green markup icon 322 or green name area 320. A static relative stopover point must retain its position relative to other static stopover points but is allowed to change its overall ordinal position in the route. A dynamic jump stopover point is allowed to change places with another dynamic jump stopover point even on a different side of a static fixed stopover point, and is thus allowed to jump over a static fixed stopover point. Examples of four types of static and dynamic stopover points are described in more detail below. Data indicating the type of dynamic or static stopover point is stored in static/dynamic markup field 260 of the record 250 of the corresponding stopover point in stopovers list data structure 200, e.g., in stopovers list database 146.

Although route plan GUI areas and active components are depicted in FIG. 3A and subsequent diagrams FIG. 3B through FIG. 4D as certain integral items in a particular arrangement on one display for purposes of illustration, in other embodiments one or more areas or active components, or portions thereof, may be arranged differently on one or more displays, or one or more areas or active components may be added or portions thereof omitted, or the GUI may be changed in some combination of ways.

Figure 3B:
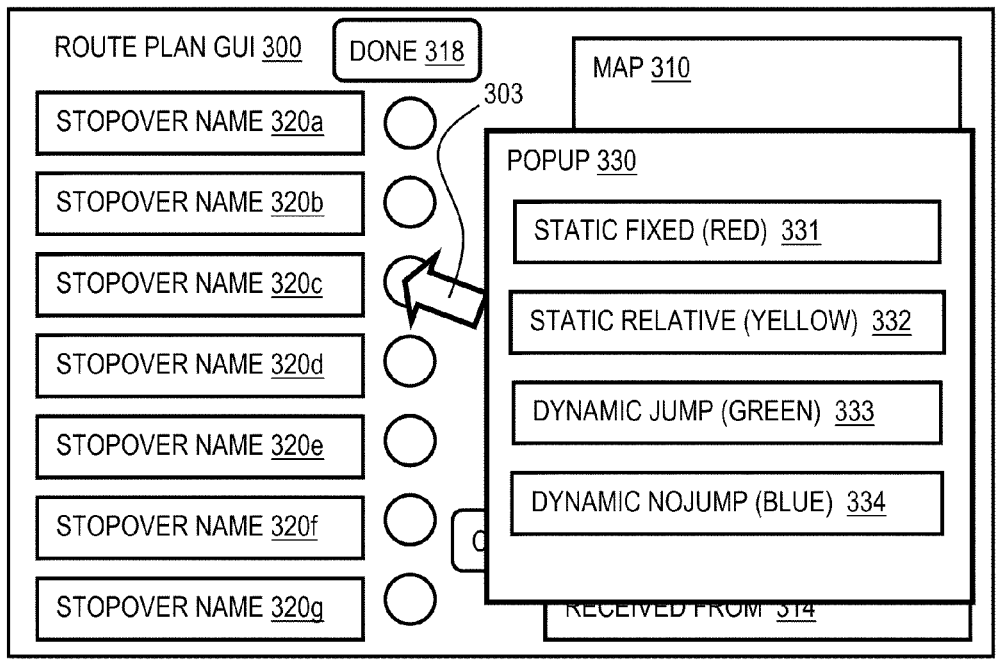
FIG. 3B is a diagram of the graphical user interface for marking mixed dynamic and static stopover points with a popup window for multiple static and dynamic types, according to an embodiment.

FIG. 3B is a diagram of the route plan graphical user interface 300 for marking mixed dynamic and static stopover points with a popup window 330 for multiple static and dynamic types, according to an embodiment. The map area 310, buttons 316, stopover name areas 320 and markup icons 322 are as described above. The popup window 330 appears, when a cursor 303 is positioned over a markup icon 322, e.g., by a user of UE 101 operating a pointing device. The popup window 330 prompts the user to use the cursor to select whether the corresponding stopover point presented in the named area 320 is a static or dynamic stopover point, and if multiple types of either is allowed, which type. In the illustrated embodiment, the user is prompted to move the cursor 303 to highlight one of the four selection areas 331, 332, 333, 334 to indicate whether the corresponding stopover point presented in name area 320c is a static fixed (red) stopover point, a static relative (yellow) stopover point, dynamic jump (green) stopover point or a dynamic no jump (blue) stopover point, respectively. After the selection is made, the popup window 330 disappears; and the markup icon 322 or stopover name field 320 is marked to indicate the selection made, e.g., by symbol or color. This information is stored as data in the static/dynamic markup field 260 of the record 250 for the corresponding stopover point in the stopovers list data structure 200, e.g., in stopovers list database 146.

In some embodiments, all stopover points in the list displayed in GUI 300 are initialized as one type of dynamic or static stopover point, unless and until a user indicates a different type of stopover point. For example, in some embodiments, all stopover points are initially indicated to be static fixed stopover points. An advantage of such an initial assignment is that a user's original order is preserved unless and until the user explicitly chooses to make one or more stopover points dynamic stopover points. Thus setting an initial static fixed type to the user input order of stopovers is a means to achieve this advantage. When a user makes such an explicit choice, a subset of less than all of a plurality of stopover points of an initial route of ordered stopover points is indicated in which subset all stopover points are marked as dynamic to indicate that their order is allowed to change. In other embodiments, other ways are used to indicate the subset of dynamic stopover points, such as receiving data indicating the subset from another node on the network, e.g., a from a client process or from a contact of the user of the UE 101 through process 148 of social network service 120.

Figure 3C:
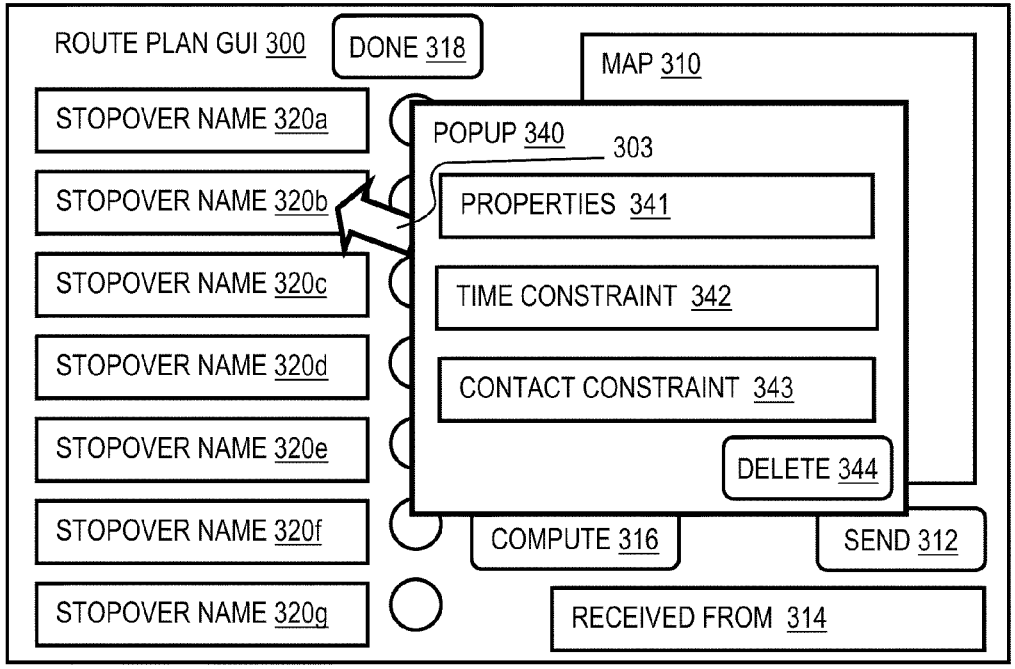
FIG. 3C is a diagram of the graphical user interface with a popup window for selecting properties and constraints for a stopover point, according to an embodiment.

FIG. 3C is a diagram of the route plan graphical user interface 300 with a popup window 340 for selecting properties and constraints for a stopover point, according to an embodiment. The map area 310, buttons 316, stopover name areas 320 and markup icons 322 are as indicated above. The popup window 340 appears when the cursor 303 is positioned over a stopover name area 320, e.g., by the user of UE 101 operating the pointing device. The popup window 340 prompts the user to use the cursor to select whether to present or edit the properties, time constraints or contact constraints for the corresponding stopover point. In the illustrated embodiment, the user is prompted to move the cursor 303 to highlight one of the three selection areas: properties 341; time constraint 342; or contact constraint 343, respectively, or to delete the stopover form the list by selecting the delete button 344 After a selection area is indicated by the user, a form appears, not shown, that allows the user to see and change the values of one or more fields that define the properties, time constraints or contact constraints associated with the stopover point, respectively. Any method known in the art may be used to present editable information in forms. When the selected forms are updated and the cursor moves off the form and the window 340, the popup window 340 disappears.

The properties form holds editable fields that indicate the stopover ID, the stopover name as it appears in the name area 320, the stopover coordinates, the original order, or the stopover owner, among others, alone or in combination. These results are indicated by data stored in the fields 252, 254, 256, 258 and 266, respectively, of the record 250 for the corresponding stopover point in the stopovers list data structure 200, e.g., in stopovers list database 146. The time constraints form holds editable fields that indicate a start time for a time window, a stop time, whether the units are relative to a start time for the route, or absolute calendar time and date, or defined dynamically based on real time data, such as the proximity of one or more contacts. These results are indicated by data stored in the time constraint field 262 of the record 250 for the corresponding stopover point in the stopovers list data structure 200, e.g., in stopovers list database 146. The contacts constraints form holds editable fields that indicate the one or more contacts who should be in the vicinity of the stopover point for it to appear on the route. These results are indicated by data stored in the contacts constraint field 264 of the record 250 for the corresponding stopover point in the stopovers list data structure 200, e.g., in stopovers list database 146.

Figure 3D:
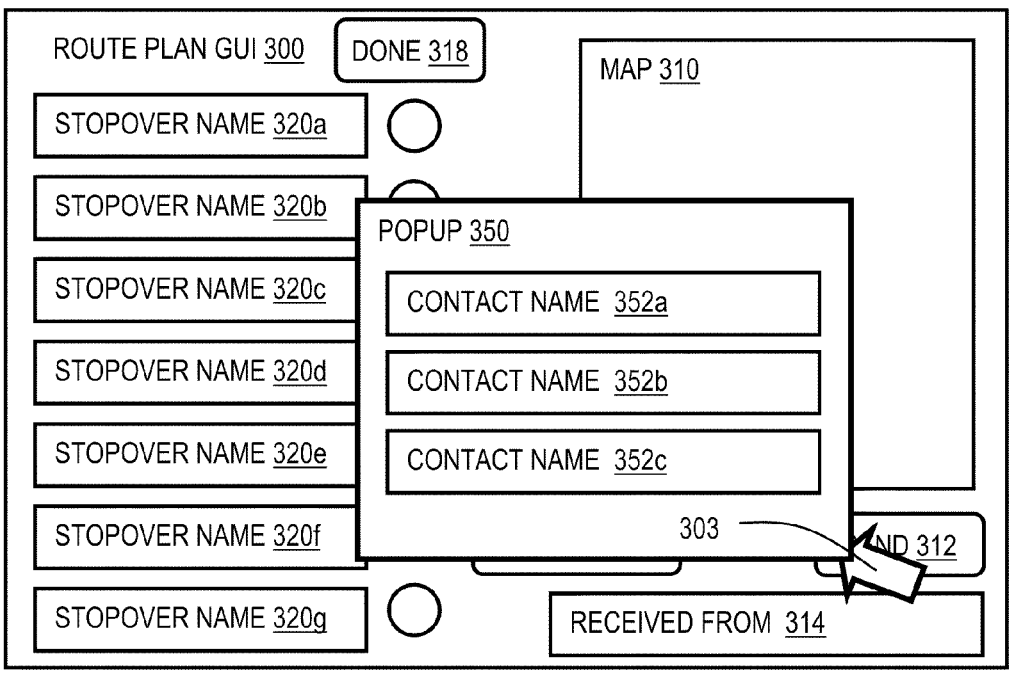
FIG. 3D is a diagram of the graphical user interface with a popup window for selecting contacts to whom a route is sent, according to an embodiment.

FIG. 3D is a diagram of the route plan graphical user interface 300 with a popup window 350 for selecting contacts to whom a route is sent, according to an embodiment. The map area 310, buttons 316, stopover name areas 320 and markup icons 322 are as indicated above. The popup window 350 appears, when a cursor 303 is positioned over the send button 312, e.g., by a user of UE 101 operating a pointing device. The popup window 350 prompts the user to use the cursor to indicate contacts to receive the list of stopover points indicated currently in the route plan GUI. These contacts are retrieved from the contacts list database 124 used by the social network client 122 to direct the data to a route sharing module 148 of the social network service 120.

FIG. 3E is a diagram of a graphical user interface 350 for marking mixed dynamic and static stopover points, according to another embodiment. In some embodiments, GUI 350 is presented in the map area 310 of route planner GUI 300. In some embodiments, GUI 350 is used instead of some or all areas of route planner GUI 300. GUI 350 depicts a map of streets 360 to navigate, with seven points of interest 352$a$, 352$b$, 352$c$, 352$d$, 352$e$, 352$f$, 352$g$ mapped thereon as circles. Also depicted is a current order 354 of the points of interest wherein point of interest 352$a$ is a first endpoint having order 1 and point of interest 352$g$ is the final endpoint having order 7. These are marked as static as indicated by the symbol #. Stopover point 352$e$ is also marked as static in $5^{th}$ order position. In other embodiments each circle can be colored, (e.g., re for static and blue for relative dynamic) instead of or in addition to the symbol markings. Stopover points are points of interest 352$b$ through 352$f$. The current order is graphically reinforced with a connecting line segment between successive points of interest in the current order. An alternative route order 370 is also presented in some embodiments, using line segments of different presentation characteristics, such as color, line width, dash format, transparency, sounds, temporal stability or other means to distinguish presentations.

A user indicates a different manual order and the type of stopover point, static or dynamic by operating a pointing device such as a mouse, a wheel or a touchscreen to first indicate one of the points of interest, whereupon a menu of options appear. In the illustrated embodiment, a two level pull down menu appears. The first level includes an order pull down menu 356 and a status pull down menu 358. Status refers to the type of stopover point, static or dynamic each of one or more subtypes. In the illustrated embodiment, a user has selected the order menu for a dynamic stopover point and is given the option to change the order among the order values allowed for dynamic stopover points (e.g., excluding order positions 1, 5 and 7).

In some embodiments, the whole route can be selected (e.g., by touching a line segment between stopover points) and the order menu of options includes a list of all the stopover points in each of several possible routes e.g. 1-2-3-4-5-6-7 or 1-4-3-2-5-6-7 for points of interest 352$a$ through 352$g$, respectively, to minimize the same or different metrics. In some embodiments, the menu is built based on user needs dynamically while the user is selecting the stop-over points, so the user has immediate feedback on the desirability of the route. The selected stop-over points are analyzed and based on analysis the options for the order menu is built. By selecting the list 1-4-3-2-5-6-7, then that will be presented on the display. Two or more route selections can be shown simultaneously so that user can compare the alternative routes, with the alternative routes indicated by different colors, line widths or dash formats, or any other presentation means known in the art.

Figure 4A:
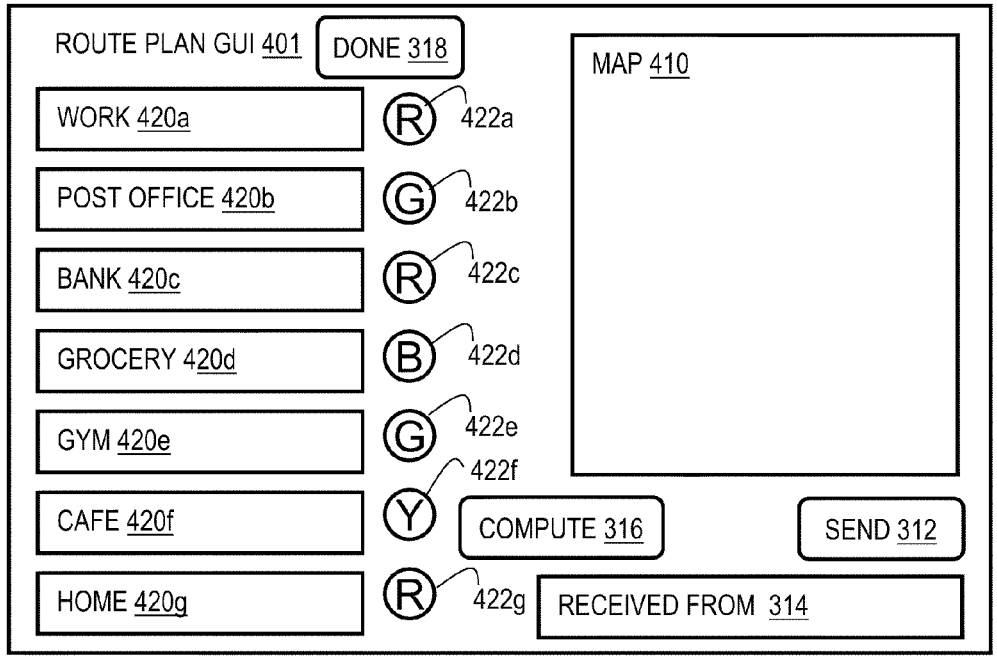
FIG. 4A is a diagram of a graphical user interface marked with mixed dynamic and static stopover points ordered as an initial route, according to an embodiment.

FIG. 4A is a diagram of a graphical user interface 401 marked with mixed dynamic and static stopover points ordered as an initial route, according to an embodiment. Send button 312, received from area 314, done button 318 and compute button 315 are as described above. Route plan GUI 401 is a particular embodiment of route plan GUI 300 with seven stopover point name areas 420a through 420g, collectively referenced as name areas 420, and corresponding colored markup icons 422a through 422g, collectively referenced as colored markup icons 422. Map area 410 is a particular embodiment of map area 310 for a region where one or more of the seven stopover points in name areas 420 are located. The initial order of stopovers, before computing positions of dynamic stopover points, is shown to include work, post office, bank, grocery, gym, café and home, which occupy ordinal positions 1 through 7, respectively, in the name areas 420a through 420g, respectively. The user has indicated a single static or dynamic type for each stopover point selected from two static types (fixed, relative) and two dynamic types (no-jump, jump) as indicated by colored markup icons 422. A red icon, for a static fixed stopover point, is indicated by the letter R in a markup icon; a yellow icon, for a static relative stopover point, is indicated by the letter Y; a blue icon, for a dynamic no-jump stopover point, is indicated by the letter B; and, a green icon, for a dynamic jump stopover point, is indicated by the letter G.

In the illustrated example embodiment, the user has made the endpoints static fixed points to ensure they stay at the first and last ordinal positions of the route, respectively. The user has determined that a stop must be made at a bank before doing anything that involves payments, including both the grocery and the café; so the user has marked the bank as red (static fixed) and the café as yellow (static relative) to ensure that it comes between the bank and home. The user could also mark the grocery as yellow, but is not sure if it minimizes the metric to go to the cafe first or the grocery, so to allow one to move relative to the other without allowing either to precede the bank, the grocery is marked blue (dynamic no-jump) so that the bank is not jumped. Neither the gym where the user has membership, nor the post office where the user is to pick up mail requires a payment and can be done in any order, so they are both marked as green (dynamic jump), allowing them to jump the bank to exchange places. The user could have marked the bank as yellow also, but for purposes of illustration it is marked red. As a consequence of being marked static fixed (red), at least one of the post office and the gym is visited before the bank and the other is visited after, so that the bank stays in its original third ordinal position. The user then presses the compute button 316 to compute the best route that minimizes the metric while retaining the order of the static stopover points. The order depicted in FIG. 4A becomes the original order.

Figure 4B:
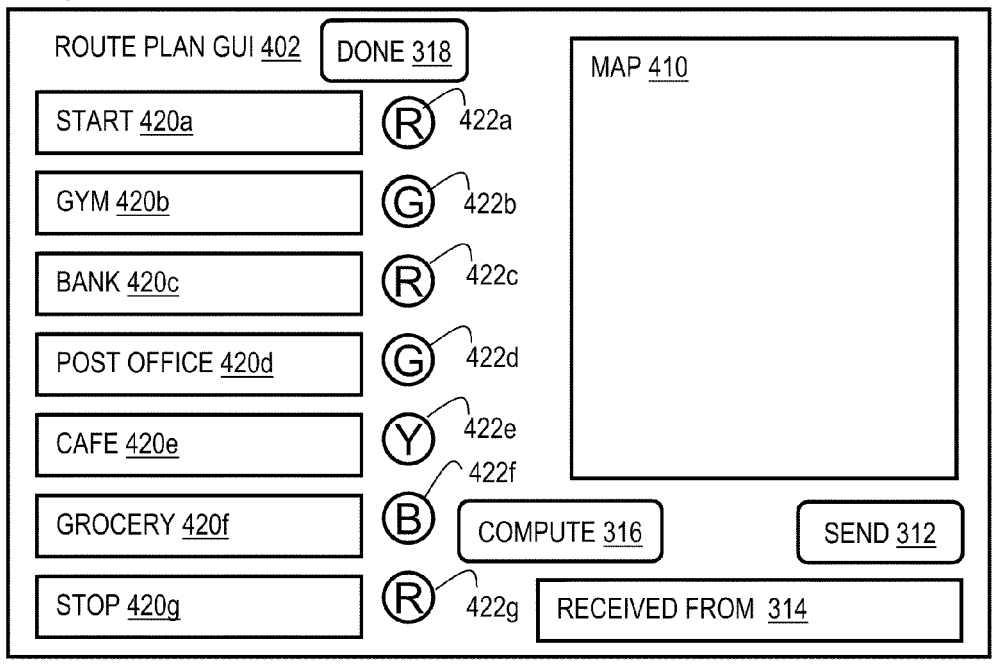
FIG. 4B is a diagram of a graphical user interface marked with mixed dynamic and static stopover points ordered as a computed route, according to an embodiment.

FIG. 4B is a diagram of a graphical user interface 402 marked with mixed dynamic and static stopover points ordered as a computed route, according to an embodiment. Send button 312, received from area 314, done button 318 and compute button 315 are as described above, as are name areas 420 and markup icons 422. The same seven stopover points are listed after computation of a route that minimizes the metric. Each retains its corresponding dynamic or static type. As can be seen, the red stopover points (static fixed) have the same order as in the original route depicted in FIG. 4A, first, third and seventh for work, bank and home, respectively. The green (dynamic jump) gym and post office have jumped the bank, indicating it costs less to visit the gym between work and bank and visit the post office between bank and home than it costs the other way around. When visiting the grocery, café and post office between bank and home, it costs less to order them post office-café-grocery than any other order. If the grocery had been marked yellow (static relative) instead of blue (dynamic no-jump), then the grocery could not come after the café; and the route's metric would have been greater.

An advantage of the four types of static and dynamic stopover points is that it gives a user more options for reducing a value of the metric than using only two types, a simple static (e.g., static fixed0 and simple dynamic (e.g., dynamic no-jump). Recording and using the four types is a means to achieve this advantage.

Figure 4C:
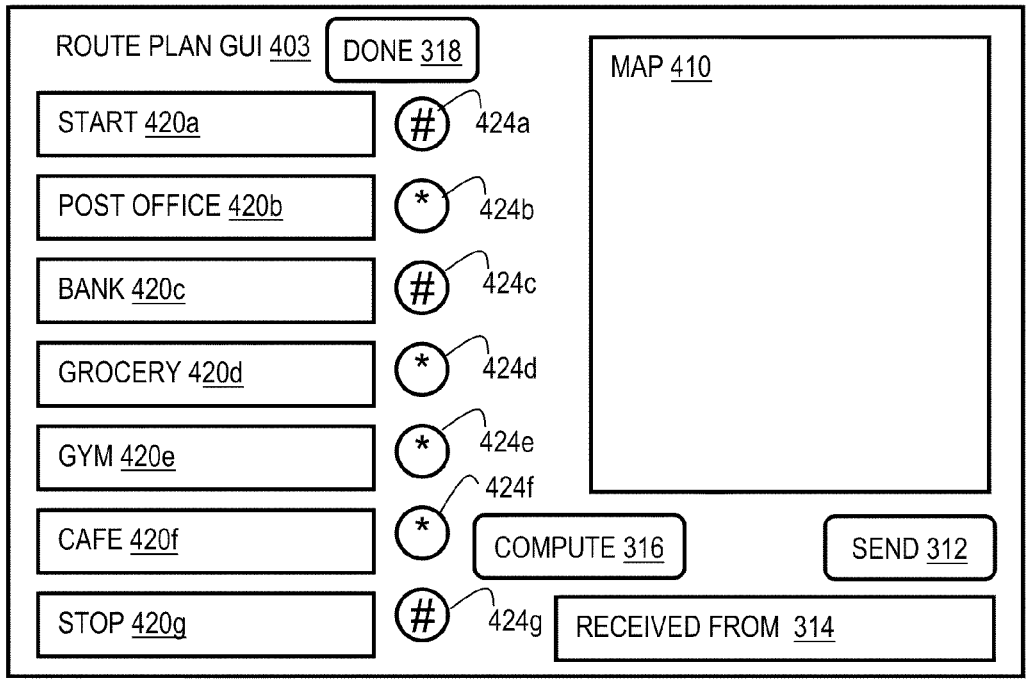
FIG. 4C is a diagram of a graphical user interface marked with simplified mixed dynamic and static stopover points ordered as an initial route, according to an embodiment.

FIG. 4C is a diagram of a graphical user interface 403 marked with simplified mixed dynamic and static stopover points ordered as an initial route, according to an embodiment. Send button 312, received from area 314, done button 318 and compute button 315 are as described above, as are name areas 420. Symbol markup icons 424a through 424g, collectively referenced as symbol markup icons 424, are used in lieu of color markup icons 422. The initial order of stopovers, before computing positions of dynamic stopover points, is shown to include work, post office, bank, grocery, gym, café and home occupying ordinal positions 1 through 7, respectively, in the name areas 420a through 420g, respectively, as in FIG. 4A. The user has indicated a single type for each stopover point selected from only one static type (fixed indicated by symbol #) and one dynamic type (no-jump indicated by symbol *) as indicated by symbol markup icons 424. Unlike the situation above, the gym cannot jump the bank to switch with the post office even to reduce the metric. The user then presses the compute button 316 to compute the best route that minimizes the metric while retaining the order of the static stopover points. The order depicted in FIG. 4C becomes the original order.

Figure 4D:
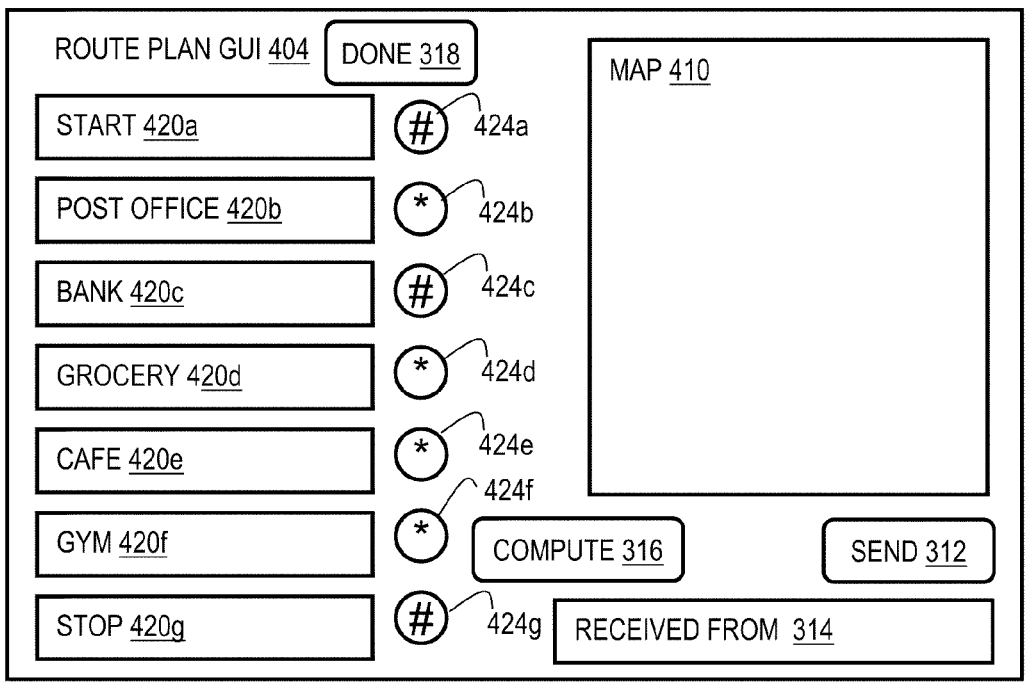
FIG. 4D is a diagram of a graphical user interface marked with simplified mixed dynamic and static stopover points ordered as a computed route, according to an embodiment.

FIG. 4D is a diagram of a graphical user interface 404 marked with simplified mixed dynamic and static stopover points ordered as a computed route, according to an embodiment. Send button 312, received from area 314, done button 318 and compute button 315 are as described above, as are name areas 420 and symbol markup icons 424. The same seven stopover points are listed after computation of a route that minimizes the metric. Each retains its corresponding dynamic or static type. As can be seen, the static stopover points (#) have the same order as in the original route depicted in FIG. 4A, first, third and seventh for work, bank and home, respectively. The dynamic (*) post office have is locked between work and bank and cannot switch. When visiting the grocery, gym, café between bank and home, it costs less to order them grocery-café-gym, than any other order An advantage of the two types of static and dynamic stopover points is that it is simpler for a user to learn and employ, and thus can speed a user's adoption of the method. Recording and using the two types is a means to achieve this advantage.

Figure 6:
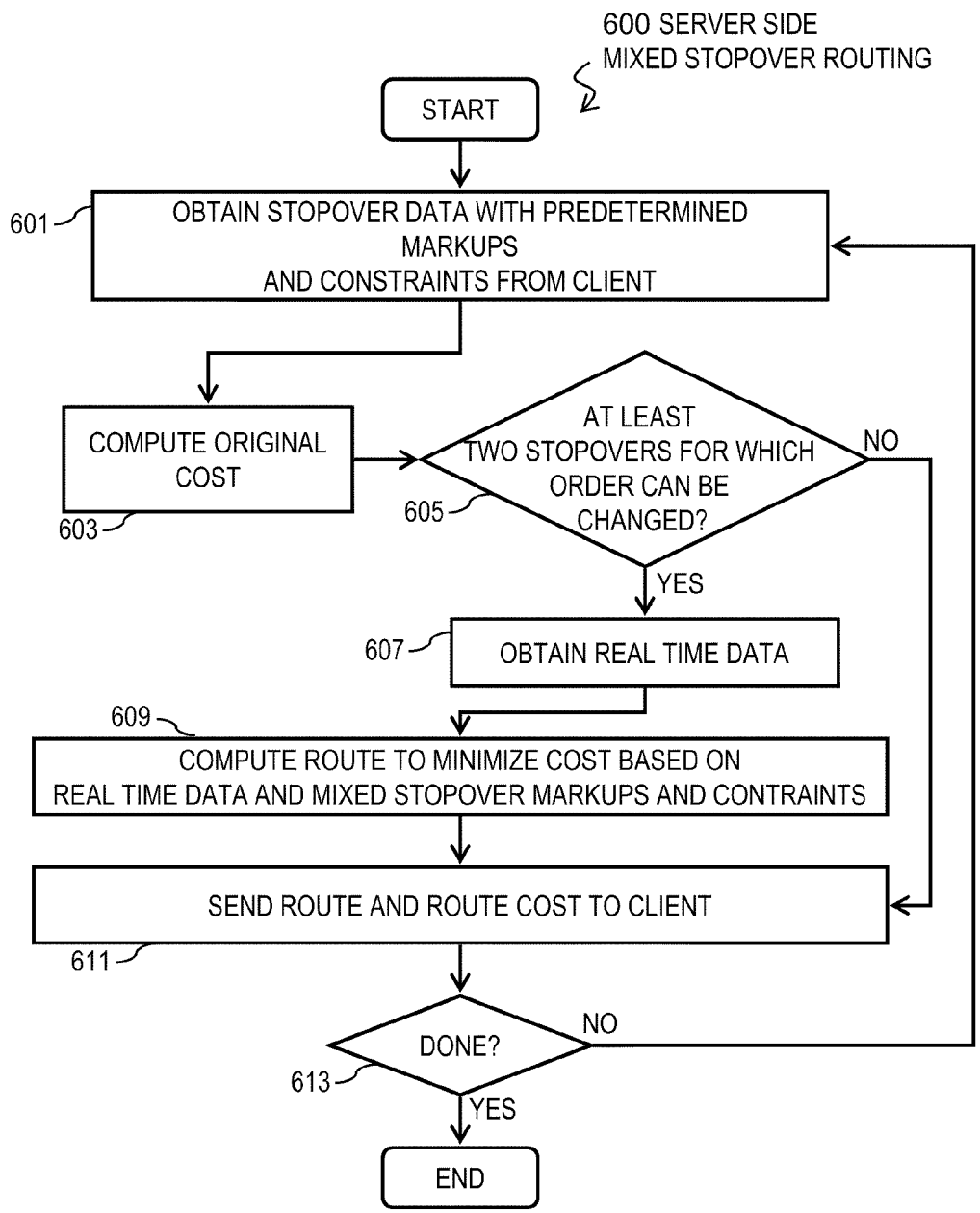
FIG. 6 is a flowchart of a server process for mixed static and dynamic routing, according to one embodiment.
Figure 7:
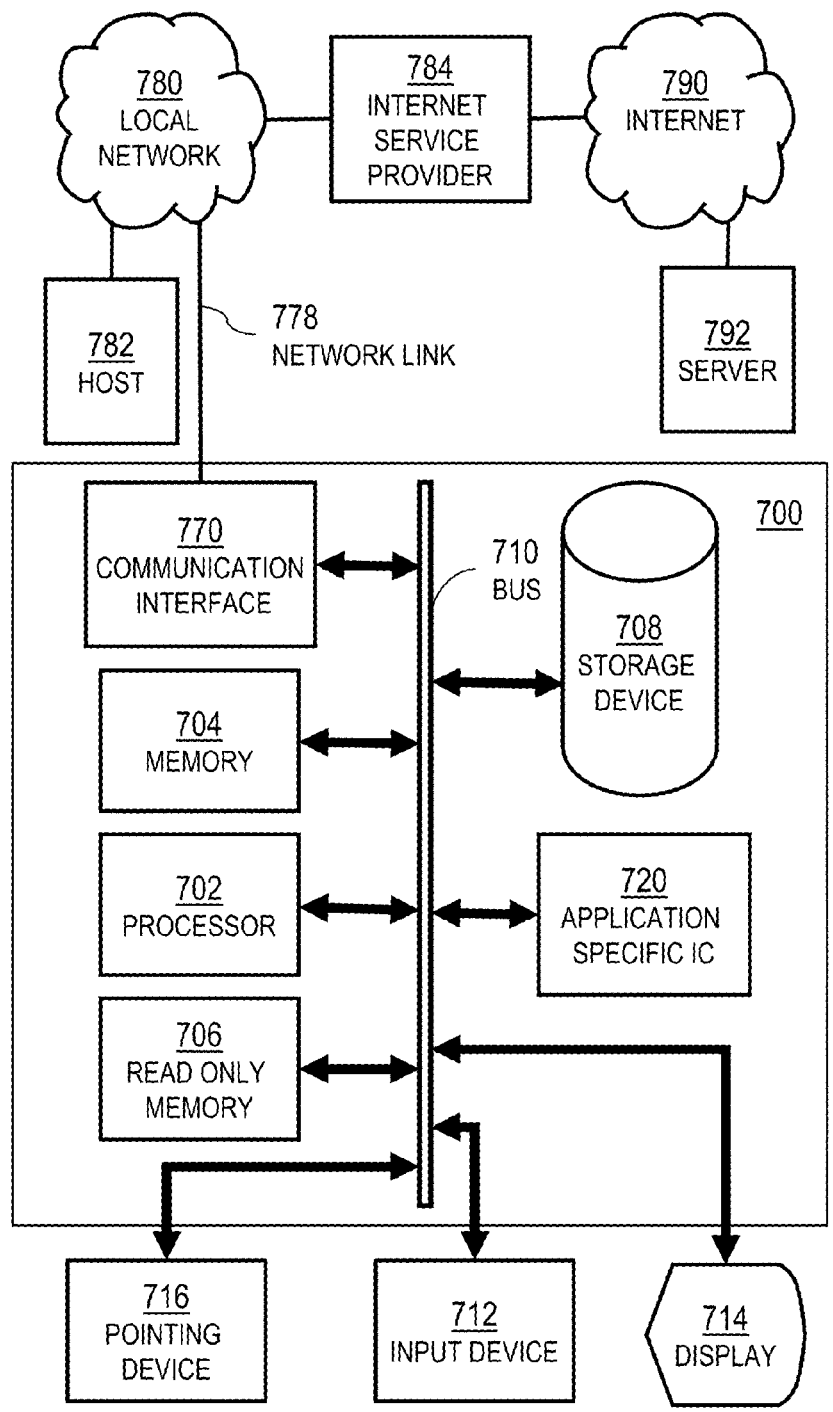
FIG. 7 is a diagram of hardware that can be used to implement an embodiment of the invention.

FIG. 5 is a flowchart of a client process 500 for mixed static and dynamic routing, according to one embodiment. In one embodiment, the client side mixed stopover markup module 144 performs the process 500 and is implemented in, for instance, a chip set including a processor and a memory as shown FIG. 8. In another embodiment the server side mixed stopover routing module 142 performs one or more steps of the process 500 and is implemented in, for instance, a computer system as shown in FIG. 7. Although steps are shown in FIG. 5 and FIG. 6 in a particular order for purposes of illustration, in other embodiments one or more steps or portions thereof are performed in a different order or overlapping in time, in series or parallel, or one or more steps are omitted or one or more other steps are added, or the process is changed in some combination of ways.

In step 501, stopover data is obtained with predetermined markup of static or dynamic type. For example, a user of UE 101 is prompted for stopover points for a route using any method known in the art, e.g., using route plan GUI 300. In the illustrated embodiment, each stopover point is associated with a predetermined static or dynamic type, e.g., data indicating a default static fixed type of stopover point. In some embodiments, the data is received at a server side mixed stopover routing module 142 and the predetermined static or dynamic types are set by a user of the client side mixed stopover markup module 144.

In step 503 the stopover data is presented to a user, e.g., in GUI 300 as depicted in FIG. 3A. In step 505 the user is prompted to change the stopover data, e.g., by adding a stopover point, deleting a stopover point, moving a stopover point, or editing a stopover point by changing its name or coordinates. For example, when a cursor 303 is positioned on a stopover name area 320, the area is highlighted for dragging and dropping to accomplish moving it, and the popup window 340 appears to change the properties of the stopover point to accomplish editing the stopover point or deleting it. When the cursor 303 is positioned on the map area 310 a point on the map is selected to accomplish adding a stopover point. In other embodiments, other methods of adding a stopover point to the list are used; any known method for adding a stopover point may be used.

In step 507, it is determined whether any change is made to the list of stopover points, e.g., by adding or editing one or more stopover points. If so, then in step 509 the change is recorded, e.g., in stopover list data structure 20, such as stopovers list database 146. The user is also prompted to change markup or constraints or both for the new or edited stopover point. For example, when a cursor 303 is positioned on a stopover name area 320, the area is highlighted and the popup window 340 appears to change the time constraints or contact constraints associated with the stopover point. The user is prompted to change the markup static or dynamic type by presenting the user with the current type in markup icon 322 or name area 320 of GUI 300. When the cursor 303 is positioned on a markup icon 322, the popup window 330 appears so that the user can change the markup to indicate any of the allowed static or dynamic types.

In step 511, it is determined whether any change is made to the markup or constraints of a stopover point. If so, then in step 513 the change is recorded, e.g., in stopover list data structure 200 in stopovers list database 146, and step 503 is performed again to present the stopover data to the user.

In some embodiments, the stopover data is received at a server side mixed stopover routing module 142; and step 503, step 505, step 507, step 509, step 511 and step 513 are omitted on the server side.

The steps above allow an arbitrary subset of stopover points to be marked as dynamic stopover points, unlike prior approaches which make all stopover points in a route between endpoints dynamic or all stopover points static. Thus a subset of less than all of a plurality of stopover points of an initial route of ordered stopover points is determined, in which subset all stopover points are marked as dynamic to indicate that their order is allowed to change.

If it is determined in step 507 or step 511 that there is no change to the stopover data, or if steps 507 or 511 are omitted, then control passes to step 521. In step 521 it is determined whether there are at least two stopover points for which order can be changed, e.g., two dynamic stopover points or at least one pair of static relative and dynamic stopover points not separated by a static fixed stopover point. If so, then in step 523 the user is prompted to compute the order of stopover points in the route. For example, the compute button 316 is grayed out until it is determined that two stopover points are marked such that their order could be changed, and then the button is displayed in full contrast, thus prompting the user to compute the order for the route.

In step 525 it is determined whether to compute the order of stopover points in the route. For example, it is determined whether the user of UE 101 has activated the compute button 316 of GUI 300. In some embodiments the stopover data is received at a server side mixed stopover routing module 142; and step 523 and step 525 are omitted.

If it is determined to compute the order of stopover points in the route, then in step 527 external real time data, such as real time traffic data or real time weather data is obtained to assist in the computation of the metric. Real time data refers to any data that changes with time and can be obtained at or near the time the computation of order for a route is performed. In some embodiments, the computed route depends on real time data, such as the current or currently predicted weather, the current or currently predicted traffic, and the current whereabouts or current planned routes of one or more contacts of the user. In step 527 any or all of this data is obtained, e.g., in some embodiments, external real time data is obtained by sending query messages over network 105 to services (not shown) that provide the information. In some embodiments, the order of stopovers in the route is not based on real time data, and step 527 is omitted. In some embodiments, step 527 is performed by the server side mixed stopover routing module 142; and step 527 is omitted from the client side mixed stopover markup module 144.

In step 529, the order of dynamic stopover points are computed to minimize a metric. The metric and metric minimization are based on the real time data, if any, constraints if any, and the markup of static or dynamic types of stopovers. For example, static stopover points are not allowed to change order relative to each other, but static relative stopover points can change their overall order in the route by changing order with one or more dynamic stopover points of either jump or no jump type in the subset of dynamic stopover points. Dynamic no jump stopover points may not jump over a static fixed stopover point, e.g., may not move from before a static fixed stopover point to after, or move from after a static fixed stopover point to before. In some embodiments, step 529 is performed by sending the stopover points and markup static or dynamic types to the mixed stopover routing module 142 and receiving, in response, the computed route with the dynamic stopover points in the computed order. In some embodiments, a computed metric for the computed route is also received. Thus in step 529, a computed route is caused to be determined in which an order in the route of the stopover points of the subset minimizes a metric for the entire route compared to any other allowed order of the stopover points in the subset.

In step 531, the current route, whether computed or as originally input by the user, is applied to some application. For example, the route is used to plot the stopover points and paths between them on a map, or to help the user navigate from one stopover point to another in the route order, or to save for future use or reuse, or to send to one or more contacts of the user through a social network. The original route input by the user is used: a) if it is determined in step 525 not to compute the route; or b) if it is determined in step 521 that there are not at least two stopover points for which order can be changed.

In step 533, it is determined whether the process is complete. If not, control passes back to step 501 to obtain stopover points for another route.

FIG. 6 is a flowchart of a server process 600 for mixed static and dynamic routing, according to one embodiment. In step 601, stopover data with predetermined markups of static or dynamic type and constraints are obtained, e.g., in one or more messages from the user of UE 101 carrying one or more data fields of the stopovers list data structure 200. The order received in step 601 is the original order and the route of stopovers in that order is called the original route.

In step 603, an original metric is determined based on the original order of stopover points obtained in step 601. In step 605, it is determined whether there are at least two stopover points for which order can be changed, e.g., two dynamic stopover points or at least one pair of static relative and dynamic stopover points not separated by a static fixed stopover point. If not, then the original route and original metric are used as the final route and final metric and sent to the client side module 144 in step 611.

If it is determined in step 605 that there are at least two stopover points for which order can be changed, then a route is computed. In step 607 external real time data is obtained, such as current or currently predicted traffic, weather or contact location. In some embodiments, real time data is not used and step 607 is omitted.

In step 609, the order of dynamic stopover points are computed to minimize a metric. The metric and metric minimization are based on the real time data, if any, constraints if any, and the markup of static or dynamic types of stopovers. For example, static stopover points are not allowed to change order relative to each other, but static relative stopover points can change their overall order in the route by changing order with one or more dynamic stopover points of either jump or no jump type in the subset of dynamic stopover points. Thus, the computed route is caused to be determined so that a stopover point marked fixed retains an original overall position in the computed route. Dynamic no jump stopover points may not jump over a static fixed stopover point, e.g., may not move from before a static fixed stopover point to after, or move from after a static fixed stopover point to before. Thus, the computed route is caused to be determined so that a no-jump dynamic stopover point does not change order relative to the stopover point marked fixed. The computed route and computed metric is used as the final route and final metric and sent to the client side module 144 in step 611.

Any time or contact constraints are also satisfied in the computed route during step 609. When a time constraint is determined for a corresponding stopover point of the route, the computed route is determined so that a user arrives at the corresponding stopover point at a time that satisfies the time constraint. When a contacts constraint is determined for a corresponding stopover point of the route, the computed route is determined so that a user arrives at the corresponding stopover point during a time when the contacts constraint is satisfied, e.g., one or more contacts are in a vicinity of the stopover point. In step 613, it is determined whether the process is complete; if so, the process ends, otherwise, steps 601-611 are repeated.

The techniques described herein provide the advantage of allowing a user to specify the order of some static stopover points but allow the navigation system to dynamically order other stopover points to minimize a total metric of a single route. Both simple and sophisticated embodiments have been described.

The processes described herein for providing mixed static and dynamic routing may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 7 illustrates a computer system 700 upon which an embodiment of the invention may be implemented. Although computer system 700 is depicted with respect to a particular device or equipment, it is contemplated that other devices or equipment (e.g., network elements, servers, etc.) within FIG. 7 can deploy the illustrated hardware and components of system 700. Computer system 700 is programmed (e.g., via computer program code or instructions) to mix static and dynamic routing as described herein and includes a communication mechanism such as a bus 710 for passing information between other internal and external components of the computer system 700. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 700, or a portion thereof, constitutes a means for performing one or more steps of mixed static and dynamic routing.

A bus 710 includes one or more parallel conductors of information so that information is transferred quickly among devices coupled to the bus 710. One or more processors 702 for processing information are coupled with the bus 710.

A processor 702 performs a set of operations on information as specified by computer program code related to mix static and dynamic routing. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 710 and placing information on the bus 710. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 702, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 700 also includes a memory 704 coupled to bus 710. The memory 704, such as a random access memory (RAM) or other dynamic storage device, stores information including processor instructions for mixed static and dynamic routing Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of processor instructions. The computer system 700 also includes a read only memory (ROM) 706 or other static storage device coupled to the bus 710 for storing static information, including instructions, that is not changed by the computer system 700. Some memory is composed of volatile storage that loses the information stored thereon when power is lost. Also coupled to bus 710 is a non-volatile (persistent) storage device 708, such as a magnetic disk, optical disk or flash card, for storing information, including instructions, that persists even when the computer system 700 is turned off or otherwise loses power.

Information, including instructions for mixed static and dynamic routing, is provided to the bus 710 for use by the processor from an external input device 712, such as a keyboard containing alphanumeric keys operated by a human user, or a sensor. A sensor detects conditions in its vicinity and transforms those detections into physical expression compatible with the measurable phenomenon used to represent information in computer system 700. Other external devices coupled to bus 710, used primarily for interacting with humans, include a display device 714, such as a cathode ray tube (CRT) or a liquid crystal display (LCD), or plasma screen or printer for presenting text or images, and a pointing device 716, such as a mouse or a trackball or cursor direction keys, or motion sensor, for controlling a position of a small cursor image presented on the display 714 and issuing commands associated with graphical elements presented on the display 714. In some embodiments, for example, in embodiments in which the computer system 700 performs all functions automatically without human input, one or more of external input device 712, display device 714 and pointing device 716 is omitted.

In the illustrated embodiment, special purpose hardware, such as an application specific integrated circuit (ASIC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a one-way or two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends or receives or both sends and receives electrical, acoustic or electromagnetic signals, including infrared and optical signals, that carry information streams, such as digital data. For example, in wireless handheld devices, such as mobile telephones like cell phones, the communications interface 770 includes a radio band electromagnetic transmitter and receiver called a radio transceiver. In certain embodiments, the communications interface 770 enables connection to the communication network 105 for mixed static and dynamic routing at the UE 101.

The term "computer-readable medium" as used herein to refers to any medium that participates in providing information to processor 702, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 708. Volatile media include, for example, dynamic memory 704. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 720.

Network link 778 typically provides information communication using transmission media through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790.

A computer called a server host 792 connected to the Internet hosts a process that provides a service in response to information received over the Internet. For example, server host 792 hosts a process that provides information representing video data for presentation at display 714. It is contemplated that the components of system 700 can be deployed in various configurations within other computer systems, e.g., host 782 and server 792.

At least some embodiments of the invention are related to the use of computer system 700 for implementing some or all of the techniques described herein. According to one embodiment of the invention, those techniques are performed by computer system 700 in response to processor 702 executing one or more sequences of one or more processor instructions contained in memory 704. Such instructions, also called computer instructions, software and program code, may be read into memory 704 from another computer-readable medium such as storage device 708 or network link 778. Execution of the sequences of instructions contained in memory 704 causes processor 702 to perform one or more of the method steps described herein. In alternative embodiments, hardware, such as ASIC 720, may be used in place of or in combination with software to implement the invention. Thus, embodiments of the invention are not limited to any specific combination of hardware and software, unless otherwise explicitly stated herein.

The signals transmitted over network link 778 and other networks through communications interface 770, carry information to and from computer system 700. Computer system 700 can send and receive information, including program code, through the networks 780, 790 among others, through network link 778 and communications interface 770. In an example using the Internet 790, a server host 792 transmits program code for a particular application, requested by a message sent from computer 700, through Internet 790, ISP equipment 784, local network 780 and communications interface 770. The received code may be executed by processor 702 as it is received, or may be stored in memory 704 or in storage device 708 or other non-volatile storage for later execution, or both. In this manner, computer system 700 may obtain application program code in the form of signals on a carrier wave.

Various forms of computer readable media may be involved in carrying one or more sequence of instructions or data or both to processor 702 for execution. For example, instructions and data may initially be carried on a magnetic disk of a remote computer such as host 782. The remote computer loads the instructions and data into its dynamic memory and sends the instructions and data over a telephone line using a modem. A modem local to the computer system 700 receives the instructions and data on a telephone line and uses an infra-red transmitter to convert the instructions and data to a signal on an infra-red carrier wave serving as the network link 778. An infrared detector serving as communications interface 770 receives the instructions and data carried in the infrared signal and places information representing the instructions and data onto bus 710. Bus 710 carries the information to memory 704 from which processor 702 retrieves and executes the instructions using some of the data sent with the instructions. The instructions and data received in memory 704 may optionally be stored on storage device 708, either before or after execution by the processor 702.

Figure 8:
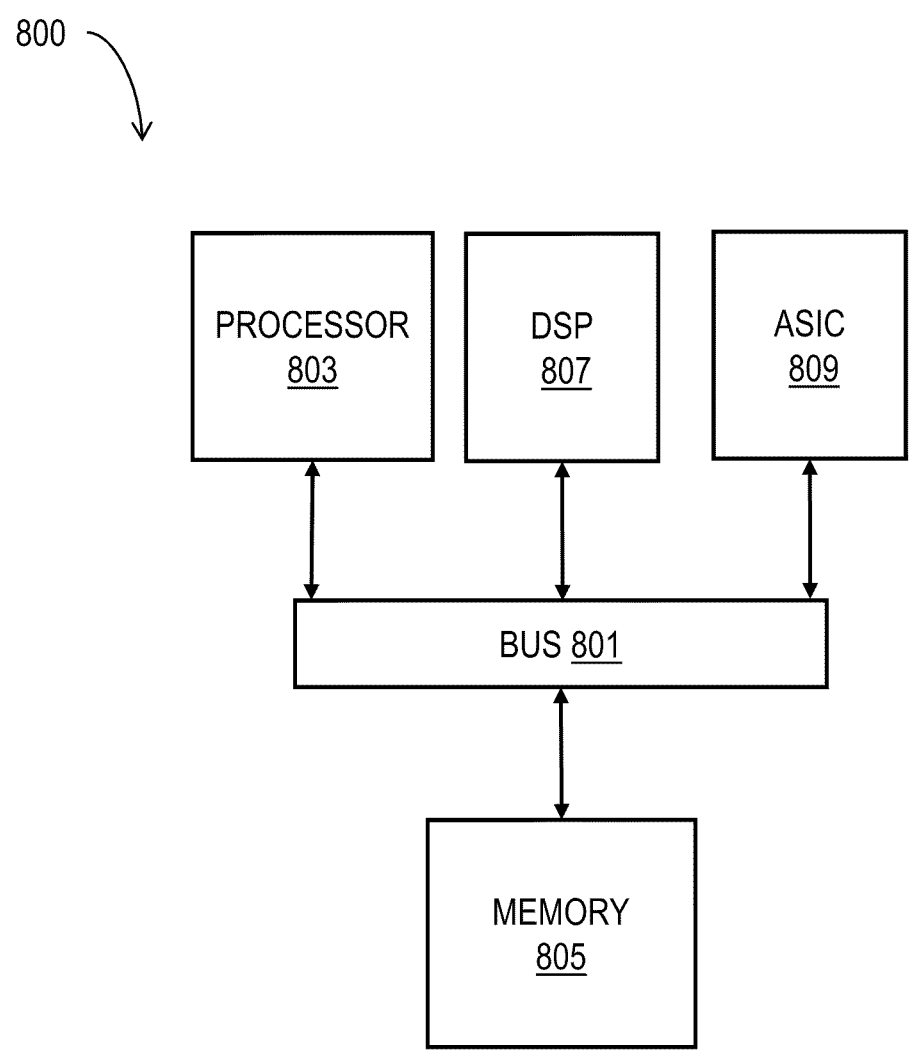
FIG. 8 is a diagram of a chip set that can be used to implement an embodiment of the invention.

FIG. 8 illustrates a chip set 800 upon which an embodiment of the invention may be implemented. Chip set 800 is programmed to mix static and dynamic routing as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 800, or a portion thereof, constitutes a means for performing one or more steps of mixed static and dynamic routing In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein for mixed static and dynamic routing. The memory 805 also stores the data associated with or generated by the execution of the inventive steps.

Figure 9:
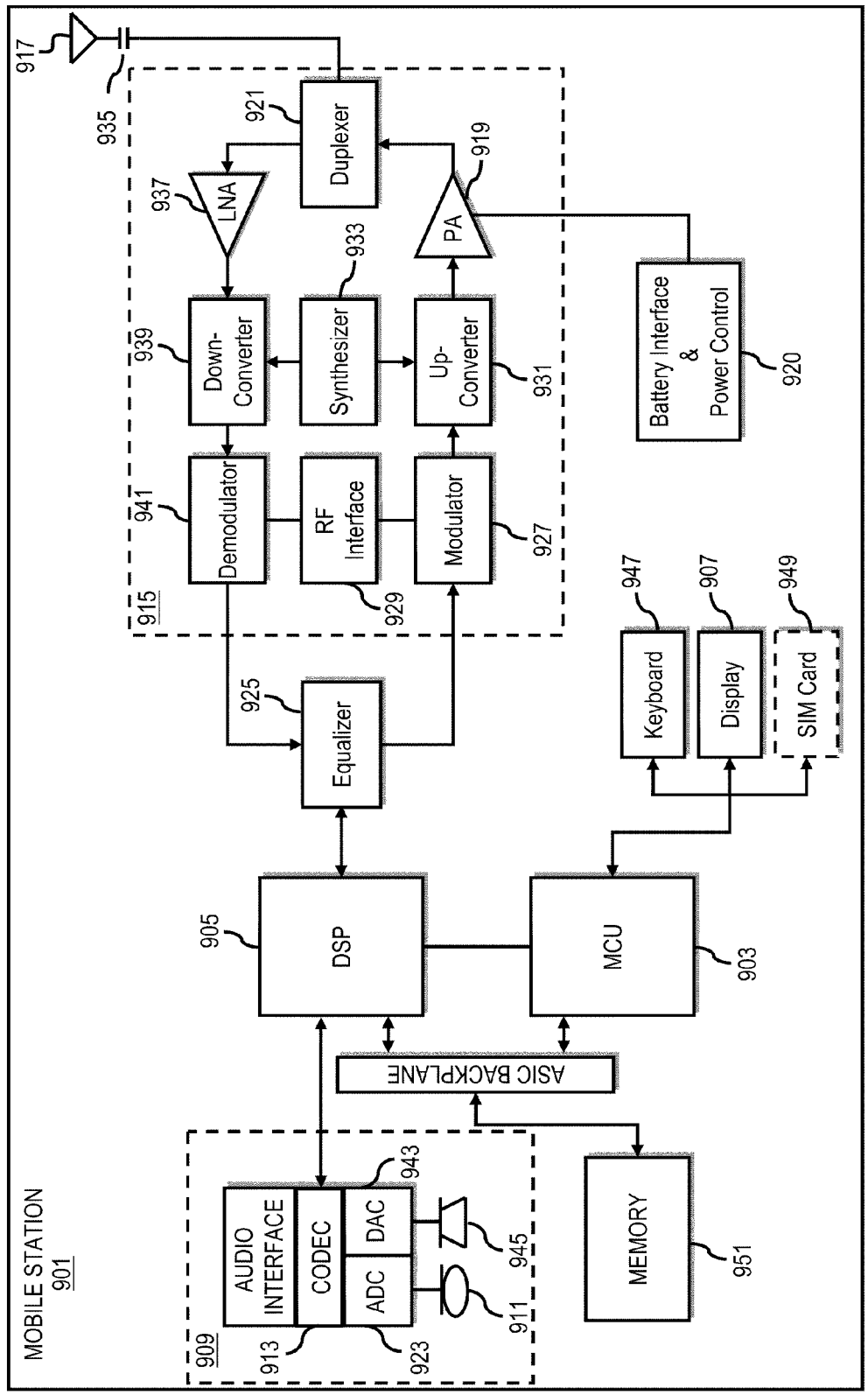
FIG. 9 is a diagram of a mobile terminal (e.g., handset) that can be used to implement an embodiment of the invention.

FIG. 9 is a diagram of exemplary components of a mobile terminal (e.g., handset) for communications, which is capable of operating in the system of FIG. 1, according to one embodiment. In some embodiments, mobile terminal 900, or a portion thereof, constitutes a means for performing one or more steps of mixed static and dynamic routing Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware.

The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 903, a Digital Signal Processor (DSP) 905, and a receiver/transmitter unit including a microphone gain control unit and a speaker gain control unit. A main display unit 907 provides a display to the user in support of various applications and mobile terminal functions that perform or support the steps of mixed static and dynamic routing. The display 9 includes display circuitry configured to display at least a portion of a user interface of the mobile terminal (e.g., mobile telephone). Additionally, the display 907 and display circuitry are configured to facilitate user control of at least some functions of the mobile terminal. An audio function circuitry 909 includes a microphone 911 and microphone amplifier that amplifies the speech signal output from the microphone 911. The amplified speech signal output from the microphone 911 is fed to a coder/decoder (CODEC) 913.

A radio section 915 amplifies power and converts frequency in order to communicate with a base station, which is included in a mobile communication system, via antenna 917. The power amplifier (PA) 919 and the transmitter/modulation circuitry are operationally responsive to the MCU 903, with an output from the PA 919 coupled to the duplexer 921 or circulator or antenna switch, as known in the art. The PA 919 also couples to a battery interface and power control unit 920.

In use, a user of mobile terminal 901 speaks into the microphone 911 and his or her voice along with any detected background noise is converted into an analog voltage. The analog voltage is then converted into a digital signal through the Analog to Digital Converter (ADC) 923. The control unit 903 routes the digital signal into the DSP 905 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 925 for compensation of any frequency-dependent impairments that occur during transmission though the air such as phase and amplitude distortion. After equalizing the bit stream, the modulator 927 combines the signal with a RF signal generated in the RF interface 929. The modulator 927 generates a sine wave by way of frequency or phase modulation. In order to prepare the signal for transmission, an up-converter 931 combines the sine wave output from the modulator 927 with another sine wave generated by a synthesizer 933 to achieve the desired frequency of transmission. The signal is then sent through a PA 919 to increase the signal to an appropriate power level. In practical systems, the PA 919 acts as a variable gain amplifier whose gain is controlled by the DSP 905 from information received from a network base station. The signal is then filtered within the duplexer 921 and optionally sent to an antenna coupler 935 to match impedances to provide maximum power transfer. Finally, the signal is transmitted via antenna 917 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 901 are received via antenna 917 and immediately amplified by a low noise amplifier (LNA) 937. A down-converter 939 lowers the carrier frequency while the demodulator 941 strips away the RF leaving only a digital bit stream. The signal then goes through the equalizer 925 and is processed by the DSP 905. A Digital to Analog Converter (DAC) 943 converts the signal and the resulting output is transmitted to the user through the speaker 945, all under control of a Main Control Unit (MCU) 903—which can be implemented as a Central Processing Unit (CPU) (not shown).

The MCU 903 receives various signals including input signals from the keyboard 947. The keyboard 947 and/or the MCU 903 in combination with other user input components (e.g., the microphone 911) comprise a user interface circuitry for managing user input. The MCU 903 runs a user interface software to facilitate user control of at least some functions of the mobile terminal 901 for mixed static and dynamic routing. The MCU 903 also delivers a display command and a switch command to the display 907 and to the speech output switching controller, respectively. Further, the MCU 903 exchanges information with the DSP 905 and can access an optionally incorporated SIM card 949 and a memory 951. In addition, the MCU 903 executes various control functions required of the terminal. The DSP 905 may, depending upon the implementation, perform any of a variety of conventional digital processing functions on the voice signals. Additionally, DSP 905 determines the background noise level of the local environment from the signals detected by microphone 911 and sets the gain of microphone 911 to a level selected to compensate for the natural tendency of the user of the mobile terminal 901.

The CODEC 913 includes the ADC 923 and DAC 943. The memory 951 stores various data including call incoming tone data and is capable of storing other data including music data received via, e.g., the global Internet. The software module could reside in RAM memory, flash memory, registers, or any other form of writable storage medium known in the art. The memory device 951 may be, but not limited to, a single memory, CD, DVD, ROM, RAM, EEPROM, optical storage, or any other non-volatile storage medium capable of storing digital data.

An optionally incorporated SIM card 949 carries, for instance, important information, such as the cellular phone number, the carrier supplying service, subscription details, and security information. The SIM card 949 serves primarily to identify the mobile terminal 901 on a radio network. The card 949 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining, by a processor, a subset of less than all of a plurality of stopover points of an initial route of ordered stopover points that are marked as dynamic to indicate that their order is changeable, the subset including one or more other subsets of less than all of the stopover points of the subset;
    determining whether there are at least two stopover points for which order is changeable; and
    if there are at least two stopover points for which order is changeable, then causing a computed route to be determined in which an order in the route of the stopover points of the subset minimizes a metric for the entire route compared to any other allowed order of the stopover points of the subset.

2. A method of claim 1, wherein:
    causing the computed route to be determined further comprises causing the marked stopover points to be sent to a navigation service; and
    in response to causing the marked stopover points to be sent, receiving the computed route from the navigation service.

3. A method of claim 1, wherein determining the subset of stopover points marked as dynamic, comprises receiving from a navigation client data that indicates the initial route of ordered stopover points and the stopover points marked as dynamic.

4. A method of claim 1, wherein:
    at least one stopover point not in the subset is marked fixed to indicate that the at least one stopover point retains an original overall position in the computed route; and
    causing the computed route to be determined further comprises causing the computed route to be determined so that the at least one stopover point marked fixed retains an original overall position in the computed route.

5. A method of claim 4, wherein:
    at least one stopover point in the subset is marked no jump dynamic to indicate that the at least one stopover point is prevented from changing order relative to the at least one stopover point marked fixed; and
    causing the computed route to be determined further comprises causing the computed route to be determined so that the at least one no jump dynamic stopover point does not change order relative to the at least one stopover point marked fixed.

6. A method of claim 1, further comprising determining the plurality of stopover points of the route based on data received from a social networking service.

7. A method of claim 1, further comprising causing the computed route to be sent to a social networking service.

8. A method of claim 1, further comprising determining a time constraint for a corresponding stopover point of the route; and causing the computed route to be determined further comprises causing the computed route to be determined so that a user arrives at the corresponding stopover point at a time that satisfies the time constraint.

9. A method of claim 8, wherein determining the time constraint further comprises determining the time constraint based on data received from a social networking service.

10. A method of claim 1, further comprising:
    determining a contact constraint for a corresponding stopover point of the route, wherein a contact constraint determines what contacts of a user are present in a vicinity of the corresponding stopover point; and
    causing the computed route to be determined further comprises causing the computed route to be determined so that a user arrives at the corresponding stopover point when conditions satisfy a contact constraint.

11. A method of claim 1, wherein the metric for the entire route is based at least in part on external real time data.

12. An apparatus comprising:
    at least one processor; and
    at least one memory including computer program code,
    the at least one memory and the computer program code configured to, with the at least one processor, cause the apparatus to perform at least the following:
    determine a subset of less than all of a plurality of stopover points of an initial route of ordered stopover points that are marked as dynamic to indicate that their order is changeable, the subset including one or more other subsets of less than all of the stopover points of the subset;
    determine whether there are at least two stopover points for which order is changeable; and
    if there are at least two stopover points for which order is changeable, then cause a computed route to be determined in which an order in the route of the stopover points of the subset minimizes a metric for the entire route compared to any other allowed order of the stopover points of the subset.

13. An apparatus of claim 12, wherein:
    at least one stopover point not in the subset is marked fixed to indicate that the at least one stopover point retains an original overall position in the computed route; and
    causing the computed route to be determined further comprises causing the computed route to be determined so that the at least one stopover point marked fixed retains an original overall position in the computed route.

14. An apparatus of claim 13, wherein:
    at least one stopover point in the subset is marked no jump dynamic to indicate that the at least one stopover point is prevented from changing order relative to the at least one stopover point marked fixed; and
    causing the computed route to be determined further comprises causing the computed route to be determined so that the at least one no jump dynamic stopover point does not change order relative to the at least one stopover point marked fixed.

15. An apparatus of claim 12, wherein the apparatus is further caused, at least in part, to determine a time constraint for a corresponding stopover point of the route; and causing the computed route to be determined further comprises causing the computed route to be determined so that a user arrives at the corresponding stopover point at a time that satisfies the time constraint.

16. An apparatus of claim 12, wherein the apparatus is a mobile phone further comprising:
    user interface circuitry and user interface software configured to facilitate user control of at least some functions of the mobile phone through use of a display and configured to respond to user input; and
    a display and display circuitry configured to display at least a portion of a user interface of the mobile phone, the display and display circuitry configured to facilitate user control of at least some functions of the mobile phone.

17. A computer-readable storage medium carrying one or more sequences of one or more instructions which, when executed by one or more processors, cause an apparatus to at least perform the following steps:
    determine a subset of less than all of a plurality of stopover points of an initial route of ordered stopover points that are marked as dynamic to indicate that their order is changeable, the subset including one or more other subsets of less than all of the stopover points of the subset;

determine whether there are at least two stopover points for which order is changeable; and if there are at least two stopover points for which order is changeable, then determine a computed route in which an order in the route of the stopover points of the subset minimizes a metric for the entire route compared to any other allowed order of the stopover points of the subset.

18. A computer-readable storage medium of claim 17, wherein:

at least one stopover point not in the subset is marked fixed to indicate that the at least one stopover point retains an original overall position in the computed route; and causing the computed route to be determined further comprises causing the computed route to be determined so that the at least one stopover point marked fixed retains an original overall position in the computed route.

19. A computer-readable storage medium of claim 18, wherein:

at least one stopover point in the subset is marked no jump dynamic to indicate that the at least one stopover point is prevented from changing order relative to the at least one stopover point marked fixed; and causing the computed route to be determined further comprises causing the computed route to be determined so that the at least one no jump dynamic stopover point does not change order relative to the at least one stopover point marked fixed.

20. A computer-readable storage medium of claim 17, wherein the apparatus is caused, at least in part, to further determine a time constraint for a corresponding stopover point of the route; and causing the computed route to be determined further comprises causing the computed route to be determined so that a user arrives at the corresponding stopover point at a time that satisfies the time constraint.

* * * * *